(12) United States Patent
Burdynska et al.

(10) Patent No.: US 10,174,173 B2
(45) Date of Patent: *Jan. 8, 2019

(54) POLYMERIZED IN-SITU HYBRID SOLID ION-CONDUCTIVE COMPOSITIONS

(71) Applicant: Blue Current, Inc., Berkeley, CA (US)

(72) Inventors: Joanna Burdynska, Berkeley, CA (US); Alexander Teran, Oakland, CA (US); Benjamin Rupert, Berkeley, CA (US); Eduard Nasybulin, Fremont, CA (US)

(73) Assignee: Blue Current, Inc., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,221

(22) Filed: Mar. 26, 2018

(65) Prior Publication Data

US 2018/0282486 A1 Oct. 4, 2018

Related U.S. Application Data

(63) Continuation of application No. 15/662,116, filed on Jul. 27, 2017, now Pat. No. 9,926,411.

(Continued)

(51) Int. Cl.
*H01B 1/22* (2006.01)
*C08G 81/00* (2006.01)
(Continued)

(52) U.S. Cl.
CPC .............. *C08G 81/024* (2013.01); *C08K 3/40* (2013.01); *H01B 1/22* (2013.01); *H01M 4/04* (2013.01);
(Continued)

(58) Field of Classification Search
CPC .......... H01B 1/00; H01B 1/22; C08G 81/024; C08K 3/40
See application file for complete search history.

(56) References Cited

U.S. PATENT DOCUMENTS 4,828,945 A   5/1989   Nagata et al.
4,879,073 A   11/1989  Kromrey
(Continued)

FOREIGN PATENT DOCUMENTS

JP    2010186682    8/2010
JP    2013033659    2/2013
WO    WO2018/023079 2/2018

OTHER PUBLICATIONS

International Search Report and Written Opinion dated May 15, 2018 issued in Application No. PCT/US18/20780.

(Continued)

*Primary Examiner* — Mark Kopec
(74) *Attorney, Agent, or Firm* — Weaver Austin Villeneuve & Sampson LLP

(57) ABSTRACT

Provided herein are methods of forming solid-state ionically conductive composite materials that include particles of an inorganic phase in a matrix of an organic phase. The methods involve forming the composite materials from a precursor that is polymerized in-situ after being mixed with the particles. The polymerization occurs under applied pressure that causes particle-to-particle contact. In some embodiments, once polymerized, the applied pressure may be removed with the particles immobilized by the polymer matrix. In some implementations, the organic phase includes a cross-linked polymer network. Also provided are solid-state ionically conductive composite materials and batteries and other devices that incorporate them. In some embodiments, solid-state electrolytes including the ionically conductive solid-state composites are provided. In some embodiments, electrodes including the ionically conductive solid-state composites are provided.

21 Claims, 16 Drawing Sheets

Related U.S. Application Data

(60) Provisional application No. 62/534,135, filed on Jul. 18, 2017, provisional application No. 62/467,022, filed on Mar. 3, 2017.

(51) Int. Cl.

| | | |
|---|---|---|
| *C08K 3/00* | (2018.01) | |
| *C08G 81/02* | (2006.01) | |
| *C08K 3/40* | (2006.01) | |
| *H01M 10/0565* | (2010.01) | |
| *H01M 10/0525* | (2010.01) | |
| *H01M 10/056* | (2010.01) | |
| *H01M 4/04* | (2006.01) | |
| *H01M 4/50* | (2010.01) | |
| *H01M 4/52* | (2010.01) | |
| *H01M 4/58* | (2010.01) | |
| *H01M 4/62* | (2006.01) | |
| *H01M 10/0562* | (2010.01) | |

(52) U.S. Cl.
CPC ............... *H01M 4/50* (2013.01); *H01M 4/52* (2013.01); *H01M 4/5805* (2013.01); *H01M 4/622* (2013.01); *H01M 10/056* (2013.01); *H01M 10/0525* (2013.01); *H01M 10/0562* (2013.01); *H01M 10/0565* (2013.01); *H01M 2300/0068* (2013.01); *H01M 2300/0074* (2013.01); *H01M 2300/0082* (2013.01)

(56) References Cited

U.S. PATENT DOCUMENTS

| | | | |
|---|---|---|---|
| 4,985,317 A | 1/1991 | Adachi et al. | |
| 4,990,413 A | 2/1991 | Lee et al. | |
| 5,360,686 A | 11/1994 | Peled et al. | |
| 5,521,026 A | 5/1996 | Brochu et al. | |
| 5,529,707 A | 6/1996 | Kejha | |
| H1576 H | 8/1996 | Walker, Jr. et al. | |
| 5,576,115 A | 11/1996 | Capuano et al. | |
| 5,599,355 A | 2/1997 | Nagasubramanian et al. | |
| 5,625,474 A | 4/1997 | Aomori et al. | |
| 5,631,103 A | 5/1997 | Eschbach et al. | |
| 5,695,873 A | 12/1997 | Kumar et al. | |
| 5,965,299 A | 10/1999 | Khan et al. | |
| 6,066,417 A | 5/2000 | Cho et al. | |
| 6,096,234 A | 8/2000 | Nakanishi et al. | |
| 6,190,806 B1 | 2/2001 | Kumar et al. | |
| 6,200,707 B1 | 3/2001 | Takada et al. | |
| 6,368,746 B1 | 4/2002 | Takada et al. | |
| 6,475,677 B1 | 11/2002 | Inda et al. | |
| 6,524,749 B1 | 2/2003 | Kaneda et al. | |
| 6,645,675 B1 | 11/2003 | Munshi | |
| 6,664,006 B1 | 12/2003 | Munshi | |
| 6,939,383 B2 | 9/2005 | Eastin et al. | |
| 7,799,467 B2 | 9/2010 | DeLongchamp et al. | |
| 8,182,943 B2 | 5/2012 | Visco et al. | |
| 8,895,194 B2 | 11/2014 | Shigeo et al. | |
| 8,951,678 B2 | 2/2015 | Jeong et al. | |
| 8,968,928 B2 | 3/2015 | Wang et al. | |
| 9,153,840 B2 | 10/2015 | Saimen et al. | |
| 9,231,253 B2 | 1/2016 | Lee et al. | |
| 9,926,411 B1* | 3/2018 | Burdynska ............... | H01B 1/22 |
| 9,972,838 B2 | 5/2018 | Teran et al. | |
| 9,972,863 B2* | 5/2018 | Teran ....................... | C03C 3/321 |
| 10,079,404 B1 | 9/2018 | Burdynska et al. | |
| 2002/0185627 A1 | 12/2002 | Chen-Yang et al. | |
| 2006/0228608 A1* | 10/2006 | Chung ................... | H01B 1/122 |
| | | | 429/483 |
| 2008/0166636 A1 | 7/2008 | Niitani et al. | |
| 2008/0268346 A1 | 10/2008 | Inda | |
| 2009/0062434 A1 | 3/2009 | Chen et al. | |
| 2009/0081553 A1 | 3/2009 | Kondo et al. | |
| 2010/0151335 A1 | 6/2010 | Senga et al. | |
| 2011/0049745 A1 | 3/2011 | Katayama et al. | |
| 2011/0287305 A1 | 11/2011 | Scordilis-Kelley et al. | |
| 2012/0039824 A1 | 2/2012 | Archer et al. | |
| 2013/0040206 A1 | 2/2013 | Yoshida et al. | |
| 2013/0289197 A1 | 10/2013 | Pavon Sierra et al. | |
| 2014/0093785 A1 | 4/2014 | Sugiura et al. | |
| 2014/0162140 A1 | 6/2014 | Hoshiba et al. | |
| 2014/0170504 A1 | 6/2014 | Baek et al. | |
| 2014/0234726 A1 | 8/2014 | Christensen et al. | |
| 2015/0030933 A1 | 1/2015 | Goetzen et al. | |
| 2015/0102257 A1 | 4/2015 | Mullins et al. | |
| 2015/0147660 A1 | 5/2015 | Fujiki et al. | |
| 2015/0188187 A1 | 7/2015 | Strand et al. | |
| 2015/0255767 A1 | 9/2015 | Aetukuri et al. | |
| 2015/0288028 A1 | 10/2015 | DeSimone et al. | |
| 2015/0349377 A1 | 12/2015 | Sugiura et al. | |
| 2015/0349380 A1 | 12/2015 | Manthiram et al. | |
| 2016/0049690 A1 | 2/2016 | Basak et al. | |
| 2017/0005367 A1 | 1/2017 | Van Berkel et al. | |
| 2017/0133717 A1 | 5/2017 | Makino et al. | |
| 2018/0034048 A1 | 2/2018 | Teran et al. | |
| 2018/0034061 A1 | 2/2018 | Teran et al. | |
| 2018/0034096 A1 | 2/2018 | Teran et al. | |
| 2018/0254513 A1 | 9/2018 | Burdynska et al. | |
| 2018/0254518 A1 | 9/2018 | Burdynska et al. | |

OTHER PUBLICATIONS

Villaluenga, et al., "Compliant glass—polymer hybrid single ion-conducting electrolytes for lithium batteries," PNAS Early Edition, 2015, pp. 1-6.

Inada, et al., "Fabrications and properties of composite solid-state electrolytes," Solid State Ionics, vol. 158, 2003, pp. 275-280.

Inada, et al., "Silicone as a binder in composite electrolytes," Journal of Power Sources, vol. 119-121, 2003, pp. 948-950.

Skaarup, et al., "Mixed phase solid electrolytes with nonconducting polymer binder," Solid State Ionics, vol. 40/41, 1990, pp. 1021-1024.

Dey, A., et al., "Micro-Structural Effect on Hydroxy Terminated Poly Butadiene (HTPB) Prepolymer and HTPB Based Composite Propellant," Molecular Nanotechnology & Nanomedicine, vol. 1, Issue 1, 2017, pp. 1-7.

Manjari, R., et al., "Structure-Property Relationship of HTPB-Based Propellants. II Formulation Tailoring for Better Mechanical Properties," Journal of Applied Polymer Science, vol. 48, 1993, 279-289.

Nairn, K., et al., "Polymer-Ceramic Ion-Conducting Composites," Solid State Ionics, 86-88, 1996, pp. 589-593.

Santoro, M., et al., "High-Pressure Synthesis of a Polyethylene/zeolite Nano-Composite Material," Nature Communications, Published Mar. 5, 2013, 7 pages.

Sasuga, et al., "Liquid-Liquid Transition and Radiation-Induced Polymerization of Vinyl Acetate at High Pressure," Macromolecules, 1983, vol. 16, No. 4, pp. 545-548.

Hu, Qichao, "Electrode-Electrolyte Interfaces in Solid Polymer Lithium Batteries," Submitted to Harvard School of Engineering and Applied Sciences, May 1, 2012, 131 pages.

MacFarlane, D. R., et al., "Lithium-ion conducting ceramic/polyether composites," Electrochimica Acta, vol. 43, Nos. 10-11, pp. 1333-1337, 1998.

Notice of Allowance, in U.S. Appl. No. 15/607,328.
Office Action, in U.S. Appl. No. 15/607,336. Published.
Notice of Allowance, in U.S. Appl. No. 15/607,336.
Office Action, in U.S. Appl. No. 15/662,116.
Notice of Allowance, in U.S. Appl. No. 15/662,116.
Invitation to Pay additional Fees dated Oct. 2, 2017, issued in Application No. PCT/US17/44530.
International Search Report and Written Opinion dated Dec. 12, 2017 issued in Application No. PCT/US17/44530.
U.S. Appl. No. 15/662,048, filed Jul. 27, 2017, Burdynska et al.
U.S. Appl. No. 15/662,102, filed Jul. 27, 2017, Burdynska et al.
Office Action, in U.S. Appl. No. 15/662,102.
Notice of Allowance, in U.S. Appl. No. 15/662,102.

\* cited by examiner

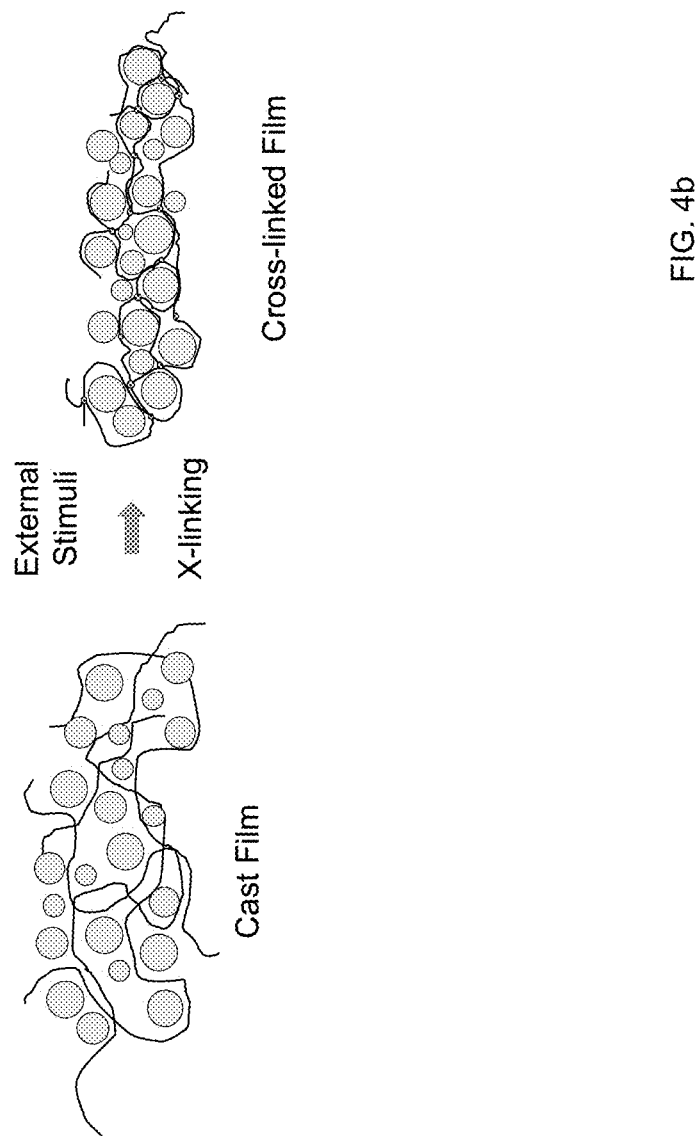

POLYMERIZED IN-SITU HYBRID SOLID ION-CONDUCTIVE COMPOSITIONS

CROSS-REFERENCE TO RELATED APPLICATIONS

This application is a continuation of and claims priority to U.S. application Ser. No. 15/662,116, filed Jul. 27, 2017, now U.S. Pat. No. 9,926,411, which claims the benefit of priority to U.S. Provisional Patent Application No. 62/467,022, filed Mar. 3, 2017 and to U.S. Provisional Patent Application No. 62/534,135, filed Jul. 18, 2017, each of which is incorporated by reference in its entirety and for all purposes.

FIELD OF INVENTION

The invention relates generally to the field of solid-state alkali-ion and alkali metal batteries. More particularly, it relates to ionically conductive composite materials and battery components, such as electrolytes and electrodes, that incorporate the ionically conductive composite materials.

BACKGROUND

Solid-state electrolytes present various advantages over liquid electrolytes for primary and secondary batteries. For example, in lithium ion secondary batteries, inorganic solid-state electrolytes may be less flammable than conventional liquid organic electrolytes. Solid-state electrolytes can also facilitate use of a lithium metal electrode by resisting dendrite formation. Solid-state electrolytes may also present advantages of high energy densities, good cycling stabilities, and electrochemical stabilities over a range of conditions. However, there are various challenges in large scale commercialization of solid-state electrolytes. One challenge is maintaining contact between electrolyte and the electrodes. For example, while inorganic materials such as inorganic sulfide glasses and ceramics have high ionic conductivities (over $10^{-4}$ S/cm) at room temperature, they do not serve as efficient electrolytes due to poor adhesion to the electrode during battery cycling. Another challenge is that glass and ceramic solid-state conductors are too brittle to be processed into dense, thin films. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films. Improving these mechanical properties without sacrificing ionic conductivity is a particular challenge, as techniques to improve adhesion, such as the addition of a solid polymer binder, tend to reduce ionic conductivity. It is normal to observe more than an order of magnitude conductivity decrease with as little as 1 wt % of binder introduced. Solid-state polymer electrolyte systems may have improved mechanical characteristics that facilitate adhesion and formation into thin films, but have low ionic conductivity at room temperature.

Materials that have high ionic conductivities at room temperature and that are sufficiently compliant to be processed into thin, dense films without sacrificing ionic conductivity are needed for large scale production and commercialization of solid-state batteries.

SUMMARY

The compositions, methods and devices of the present invention each have inventive aspects. One aspect of the invention relates to a solid-state electrolyte composition. The solid-state electrolyte includes ionically conductive inorganic particles in a non-ionically conductive polymer matrix, wherein the non-ionically conductive polymer matrix includes a cross-linked polymer network, and wherein the composition has an ion conductivity of at least $1 \times 10^{-4}$ S·cm$^{-1}$. In some embodiments, the ionically conductive inorganic particles are at least 50% by weight of the composition. In some embodiments, the non-ionically conductive organic matrix includes a polymer binder. In some embodiments, the polymer binder may be between 1-5% by weight of the composition. In some embodiments, the polymer matrix is free of polymer binder.

In some embodiments, the non-ionically conductive polymer matrix is 2.5%-60% by weight of the composition. In some embodiments, the non-ionically conductive polymer matrix is at least 20% by weight of the composition. In some embodiments, the ionically conductive inorganic particles are sulfide glass particles. In some embodiments, the non-ionically conductive polymer matrix is polymerized in-situ. In some embodiments, the cross-linked polymer network includes a backbone selected from a polyolefin, a polysiloxane, a perfluoropolyether, polystyrene, and a cyclic olefin polymer. In some embodiments, the cross-linked polymer network includes a polydimethylsiloxane (PDMS) backbone. In some embodiments, the cross-linked polymer network includes a polybutadiene (PBD) backbone. In some embodiments, the cross-linked polymer network includes a cured epoxy resin. In some embodiments, the cross-linked polymer network includes urea-urethane groups, urethane groups, or thiourethane groups. In some embodiments, the cross-linked polymer network includes a poly(urethane), a poly(ureaurethane), poly(thiourethane), a poly(acrylate), a poly(methacrylate), a poly(maleimide), poly(acrylamide), a poly(methacrylamide), a polyolefin, or a polystyrene.

In some embodiments, the composition includes one or more unreacted reactants or byproducts of a polymerization reaction. In some embodiments, the unreacted reactant includes isocyanate functional groups. The isocyanate functional groups may be blocked. In some embodiments, the unreacted reactant includes one or more of an amine functional group, an alcohol functional group, a thiol functional group, and a blocked isocyanate. In some embodiments, the unreacted reactant includes one or more functional cross-linkers. In some embodiments, the unreacted reactant includes a radical initiator. In some embodiments, the unreacted reactant includes functional groups selected from one or more of: an acrylic functional group, a methacrylic functional group, an acrylamide functional group, a methacrylamide functional group, a styrenic functional group, an alkenyl functional group, an alkynyl functional group, a vinyl functional group, allyl functional group, and a maleimide functional group. In some embodiments, the unreacted reactant includes functional groups selected from one or more of: epoxy resins, oxiranes, glycidyl groups, and alkene oxides.

In some embodiments, wherein the cross-linked polymer network includes one or more linking groups selected from:

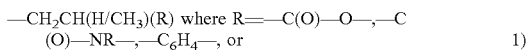

1)

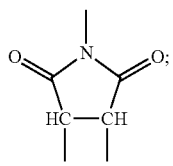

—NH—C(O)—NR—, where R is H,alkyl or aryl; 2)

—NH—C(O)—O—; and 3)

—NH—C(O)—S—. 4)

Another aspect of the invention relates to a battery including an anode; a cathode; and a solid-state electrolyte including ionically conductive inorganic particles in a non-ionically conductive polymer matrix, wherein the non-ionically conductive polymer matrix includes a cross-linked polymer network, and wherein the composition has an ion conductivity of at least $1\times10^{-4}$ S·cm$^{-1}$.

Another aspect of the invention relates to a method of forming a solid-state ionically conductive composition. The method includes providing a mixture of polymer matrix precursors and ionically conductive inorganic particles; initiating polymerization of the polymer matrix precursors while applying a pressure of at least 10 MPa to the mixture to form a polymer matrix; and after polymerizing the polymer matrix precursors, releasing the applied pressure.

In some embodiments, the polymer matrix precursors and the ionically conductive inorganic particles are mixed in a solution. In some embodiments, the solution is cast on a substrate to form a film prior to initiating polymerization of the polymer matrix precursors. In some embodiments, the film is dried prior to initiating polymerization of the polymer matrix precursors. In some embodiments, initiating polymerization of the polymer matrix precursors includes heating the polymer matrix precursor. In some embodiments, the method further includes mixing a thermal radical initiator with the polymer matrix precursors and the ionically conductive inorganic particles. In some embodiments, the polymer matrix precursors include polymer matrix precursors functionalized with a first type of functional group and polymer matrix precursors functionalized with a second type of functional group, the first type of functional group being reactive with the second type of functional group. In some embodiments, one or both of the first and second types of functional groups are blocked. In some embodiments, the polymerization is addition polymerization. In some embodiments, the polymerization is ring opening polymerization. In some embodiments, polymerizing the polymer matrix precursors includes cross-linking. In some embodiments, initiating polymerization of the polymer matrix precursors includes exposing the polymer matrix precursors to ultraviolet radiation. In some embodiments, the polymerization is radical polymerization In some embodiments, the mixture of polymer matrix precursors and ionically conductive inorganic particles is a dry mixture. In some embodiments, the method further includes extruding the mixture of polymer matrix precursors and ionically conductive inorganic particles.

In some embodiments, applying pressure increases the ionic conductivity of the composite by a factor of at least two. The increase ionic conductivity may be maintained after releasing the applied pressure.

In some embodiments, providing a mixture of polymer matrix precursors and ionically conductive inorganic particles includes a first in-situ polymerization to form linear polymers. In some such embodiments, wherein polymerizing polymer matrix precursors comprises cross-linking the linear polymers. The first in-situ polymerization may be performed at a first temperature lower than the temperature of the cross-linking. According to various embodiments, the first polymer in-situ polymerization may be performed prior to applying pressure to the mixture or while applying pressure to the mixture.

Another aspect of the invention relates to a method including mixing polymer matrix precursors and ionically conductive inorganic particles; optionally polymerizing the polymer matrix precursors to form polymerized linear polymers; initiating cross-linking of one or both of the polymer matrix precursors and polymerized linear polymers while applying a pressure of at least 10 MPa to the mixture to form a polymer matrix; and after cross-linking, releasing the applied pressure.

In some embodiments, the method includes polymerizing the polymer matrix precursors to form linear polymers prior to applying the pressure. In some such embodiments, cross-linking includes cross-linking the linear polymers.

In some embodiments, the polymer matrix precursors include di-functional polymer matrix precursors and tri-functional cross-linking agents. The tri-functional cross-linking agents may include blocked isocyanate groups. In some embodiments, the di-functional polymer matrix precursors are polymerized to form linear polymers prior to cross-linking.

In some embodiments, applying pressure increases the ionic conductivity of the composite by a factor of at least two. The increase ionic conductivity may be maintained after releasing the applied pressure.

Another aspect of the invention relates to an ionically conductive composite material that includes ionically conductive inorganic particles in a non-ionically conductive polymer matrix, wherein the composition has an ion conductivity of at least $1\times10^{-4}$ S·cm$^{-1}$. In some embodiments, the ionically conductive inorganic particles are at least 50% by weight of the composition. In some embodiments, the non-ionically conductive organic matrix includes a polymer binder. In some embodiments, the polymer binder may be between 1-5% by weight of the composition. In some embodiments, the polymer matrix is free of polymer binder.

In some embodiments, the non-ionically conductive polymer matrix is 2.5%-60% by weight of the composition. In some embodiments, the non-ionically conductive polymer matrix is at least 20% by weight of the composition. In some embodiments, the ionically conductive inorganic particles are sulfide glass particles. In some embodiments, the non-ionically conductive polymer matrix is polymerized in-situ. In some embodiments, the polymer network includes a backbone selected from a polyolefin, a polysiloxane, a perfluoropolyether, polystyrene, and a cyclic olefin polymer. In some embodiments, the polymer network includes a polydimethylsiloxane (PDMS) backbone. In some embodiments, the polymer network includes a polybutadiene (PBD) backbone. In some embodiments, the polymer network includes a cured epoxy resin. In some embodiments, the polymer network includes urea-urethane groups, urethane groups, or thiourethane groups. In some embodiments, the polymer network includes a poly(urethane), a poly(ureaurethane), poly(thiourethane), a poly(acrylate), a poly(methacrylate), a poly(maleiamide), poly(acrylamide), a poly (methacrylamide), a polyolefin, or a polystyrene.

In some embodiments, the composition includes one or more unreacted reactants or byproducts of a polymerization reaction. In some embodiments, the unreacted reactant includes isocyanate functional groups. The isocyanate functional groups may be blocked. In some embodiments, the unreacted reactant includes one or more of an amine functional group, an alcohol functional group, a thiol functional group, and a blocked isocyanate. In some embodiments, the unreacted reactant includes one or more functional cross-linkers. In some embodiments, the unreacted reactant includes a radical initiator. In some embodiments, the unreacted reactant includes functional groups selected from one or more of: an acrylic functional group, a methacrylic functional group, an acrylamide functional group, a methacrylamide functional group, a styrenic functional group, an alkenyl functional group, an alkynyl functional group, a vinyl functional group, allyl functional group, and a maleimide functional group. In some embodiments, the unreacted reactant includes functional groups selected from one or more of: epoxy resins, oxiranes, glycidyl groups, and alkene oxides.

In some embodiments, wherein the polymer network includes one or more linking groups selected from:

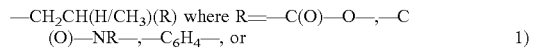

1)

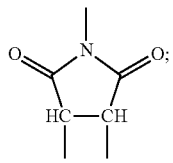

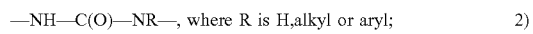

2)

3)

4)

Another aspect of the invention relates to a battery including an anode; a cathode; and a solid-state electrolyte including ionically conductive inorganic particles in a non-ionically conductive polymer matrix, wherein the non-ionically conductive polymer matrix includes a polymer network, and wherein the composition has an ion conductivity of at least $1 \times 10^{-4}$ S cm$^{-1}$.

Another aspect of the invention relates to a method of forming a solid-state ionically conductive composition. The method includes providing a mixture of polymer matrix precursors and ionically conductive inorganic particles; initiating polymerization of the polymer matrix precursors while applying a pressure of at least 10 MPa to the mixture to form a polymer matrix; and after polymerizing the polymer matrix precursors, releasing the applied pressure.

In some embodiments, the polymer matrix precursors and the ionically conductive inorganic particles are mixed in a solution. In some embodiments, the solution is cast on a substrate to form a film prior to initiating polymerization of the polymer matrix precursors. In some embodiments, the film is dried prior to initiating polymerization of the polymer matrix precursors. In some embodiments, initiating polymerization of the polymer matrix precursors includes heating the polymer matrix precursor. In some embodiments, the method further includes mixing a thermal radical initiator with the polymer matrix precursors and the ionically conductive inorganic particles. In some embodiments, the polymer matrix precursors include polymer matrix precursors functionalized with a first type of functional group and polymer matrix precursors functionalized with a second type of functional group, the first type of functional group being reactive with the second type of functional group. In some embodiments, one or both of the first and second types of functional groups are blocked. In some embodiments, the polymerization is addition polymerization. In some embodiments, the polymerization is ring opening polymerization. In some embodiments, polymerizing the polymer matrix precursors includes cross-linking. In some embodiments, initiating polymerization of the polymer matrix precursors includes exposing the polymer matrix precursors to ultra-violet radiation. In some embodiments, the polymerization is radical polymerization.

Another aspect of the invention relates to a solid-state electrode for use in an alkali ion or alkali metal battery that includes an inorganic phase comprising an ionically conductive amorphous inorganic material, an electrochemically active material, and an electronically conductive additive; and an organic phase comprising a non-ionically conductive polymer matrix. In some embodiments, the non-ionically conductive polymer matrix is crosslinked. In some embodiments, the electrochemically active material is selected from lithium cobalt oxide (LCO), lithium manganese oxide (LMO), lithium nickel cobalt aluminum oxide (NCA), lithium iron phosphate (LFP) and lithium nickel cobalt manganese oxide (NCM). In some embodiments, the electrochemically active material is selected from carbon-containing material, a silicon-containing material, a tin-containing material, lithium, or a lithium alloyed metal. The solid-state electrode may be a cathode or an anode according to various embodiments. In some embodiments, the electrode may be in contact with a solid-state electrolyte as described above to form an electrolyte-electrode bilayer.

Another aspect of the invention relates to a method of forming an ionically conductive composite including mixing polymer matrix precursors and ionically conductive inorganic particles and initiating cross-linking in the mixture to form a polymer matrix, wherein cross-linking increases the ionic conductivity by a factor of at least two. In some embodiments, the cross-linking is performed under an applied external pressure of at least 10 MPa. The cross-linking may be performed under an ambient pressure.

These and other aspects are described further below with reference to the Figures.

BRIEF DESCRIPTION OF DRAWINGS

FIG. 4b provides an example of a schematic depiction of a cast film including ionically conductive inorganic particles in a polymer matrix undergoing in-situ polymerization according to certain embodiments of the invention to cross-link the polymer chains without applied pressure.

DETAILED DESCRIPTION

Figure 1:
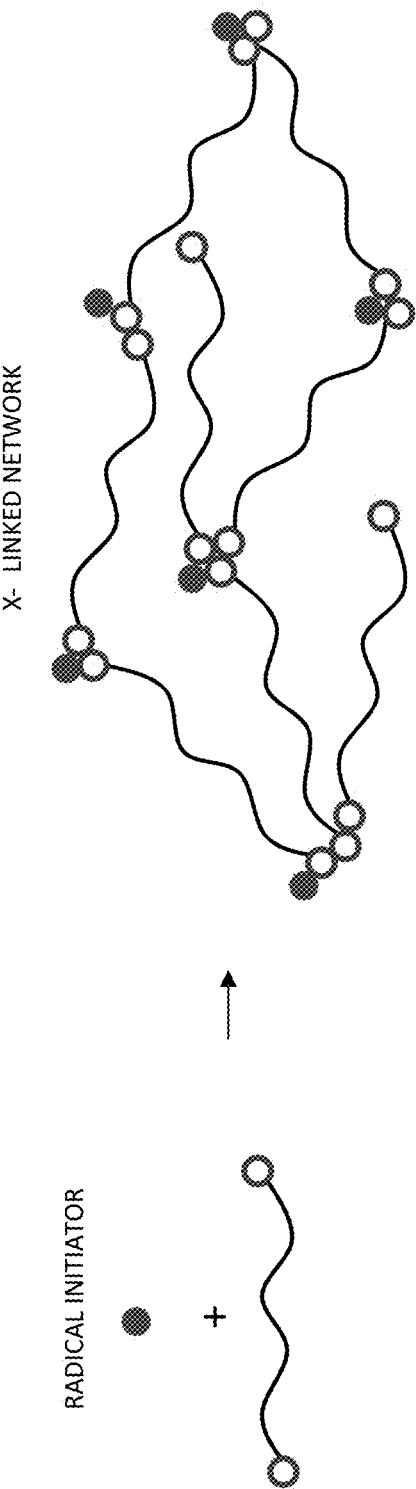
FIG. 1 provides a schematic example of formation of a cross-linked network formed by radical polymerization according to certain embodiments of the invention.

One aspect of the present invention relates to ionically conductive solid-state compositions that include ionically conductive inorganic particles in a matrix of an organic material. The resulting composite material has high ionic conductivity and mechanical properties that facilitate processing. In particular embodiments, the ionically conductive solid-state compositions are compliant and may be cast as films.

Another aspect of the present invention relates to batteries that include the ionically conductive solid-state compositions described herein. In some embodiments of the present invention, solid-state electrolytes including the ionically conductive solid-state compositions are provided. In some embodiments of the present invention, electrodes including the ionically conductive solid-state compositions are provided.

Particular embodiments of the subject matter described herein may have the following advantages. In some embodiments, the ionically conductive solid-state compositions may be processed to a variety of shapes with easily scaled-up manufacturing techniques. The manufactured composites are compliant, allowing good adhesion to other components of a battery or other device. The solid-state compositions have high ionic conductivity, allowing the compositions to be used as electrolytes or electrode materials. In some embodiments, ionically conductive solid-state compositions enable the use of lithium metal anodes by resisting dendrites. In some embodiments, the ionically conductive solid-state compositions do not dissolve polysulfides and enable the use of sulfur cathodes.

Further details of the ionically conductive solid-state compositions, solid-state electrolytes, electrodes, and batteries according to embodiments of the present invention are described below.

The ionically conductive solid-state compositions may be referred to as hybrid compositions herein. The term "hybrid" is used herein to describe a composite material including an inorganic phase and an organic phase. The term "composite" is used herein to describe a composite of an inorganic material and an organic material.

In some embodiments, the composite materials are formed from a precursor that is polymerized in-situ after being mixed with inorganic particles. The polymerization may take place under applied pressure that causes particle-to-particle contact. Once polymerized, applied pressure may be removed with the particles immobilized by the polymer matrix. In some implementations, the organic material includes a cross-linked polymer network. This network may constrain the inorganic particles and prevents them from shifting during operation of a battery or other device that incorporates the composite.

The resulting composite has high conductivity values close to the conductivity of the pristine solid-state ion conductor particles. The result is highly conducting, dense, and compliant material which can be easily processed to desired shapes. "Pristine" refers to the particles prior to incorporation into the composite. According to various embodiments, the material has at least half, at least 80%, or at least 90% of the ionic conductivity of the particles.

In some embodiments, the polymerization may cause particle-to-particle contact without applied external pressure. For example, certain polymerization reactions that include cross-linking may lead to sufficient contraction that particle-to-particle contact and high conductivity is achieved without applied pressure during the polymerization.

The polymer precursor and the polymer matrix are compatible with the solid-state ionically conductive particles, non-volatile, and non-reactive to battery components such as electrodes. The polymer precursor and the polymer matrix may be further characterized by being non-polar or having low-polarity. The polymer precursor and the polymer matrix may interact with the inorganic phase such that the components mix uniformly and microscopically well, without affecting at least the composition of the bulk of the inorganic phase. Interactions can include one or both of physical interactions or chemical interactions. Examples of physical interactions include hydrogen bonds, van der Waals bonds, electrostatic interactions, and ionic bonds. Chemical interactions refer to covalent bonds. A polymer matrix that is generally non-reactive to the inorganic phase may still form bonds with the surface of the particles, but does not degrade or change the bulk composition of the inorganic phase. In some embodiments, the polymer matrix may mechanically interact with the inorganic phase.

The term "number average molecular weight" or "$M_n$" in reference to a particular component (e.g., a high molecular weight polymer binder) of a solid-state composition refers to the statistical average molecular weight of all molecules of the component expressed in units of g/mol. The number average molecular weight may be determined by techniques known in the art such as, for example, gel permeation chromatography (wherein $M_n$ can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation below, $$M_n = \frac{\Sigma N_i M_i}{\Sigma N_i}$$

wherein $M_i$ is the molecular weight of a molecule and $N_i$ is the number of molecules of that molecular weight.

The term "weight average molecular weight" or "$M_w$" in reference to a particular component (e.g., a high molecular weight polymer binder) of a solid-state composition refers to the statistical average molecular weight of all molecules of the component taking into account the weight of each molecule in determining its contribution to the molecular weight average, expressed in units of g/mol. The higher the molecular weight of a given molecule, the more that molecule will contribute to the $M_w$ value. The weight average molecular weight may be calculated by techniques known in the art which are sensitive to molecular size such as, for example, static light scattering, small angle neutron scattering, X-ray scattering, and sedimentation velocity. The weight average molecular weight is defined by the equation below, $$M_w = \frac{\Sigma N_i M_i^2}{\Sigma N_i M_i}$$

wherein '$M_i$' is the molecular weight of a molecule and '$N_i$' is the number of molecules of that molecular weight. In the description below, references to molecular weights of particular polymers refer to number average molecular weight.

The term "alkyl" as used herein alone or as part of another group, refers to a straight or branched chain hydrocarbon containing any number of carbon atoms and that include no double or triple bonds in the main chain. "Lower alkyl" as used herein, is a subset of alkyl and refers to a straight or branched chain hydrocarbon group containing from 1 to 4 carbon atoms. The terms "alkyl" and "lower alkyl" include both substituted and unsubstituted alkyl or lower alkyl unless otherwise indicated. Examples of lower alkyl include methyl, ethyl, n-propyl, iso-propyl, n-butyl, iso-butyl, tert-butyl, and the like.

The term "aryl" as used herein refers to groups that include monocyclic and bicyclic aromatic groups. Examples include phenyl groups.

Inorganic Phase

The inorganic phase of the composite materials described herein conducts alkali ions. In some embodiments, it is responsible for all of the ion conductivity of the composite material, providing ionically conductive pathways through the composite material.

In some embodiments, the inorganic phase is a particulate solid-state material that conducts alkali ions. In the examples given below, lithium ion conducting materials are chiefly described, though sodium ion conducting or other alkali ion conducting materials may be employed. According to various embodiments, the materials may be glass particles, ceramic particles, or glass ceramic particles. The solid-state compositions described herein are not limited to a particular type of compound but may employ any solid-state inorganic ionically conductive particulate material, examples of which are given below.

In some embodiments, the inorganic material is a single ion conductor, which has a transference number close to unity. The transference number of an ion in an electrolyte is the fraction of total current carried in the electrolyte for the ion. Single-ion conductors have a transference number close to unity. According to various embodiments, the transference number of the inorganic phase of the solid electrolyte is at least 0.9 (for example, 0.99).

The inorganic phase may be an oxide-based composition, a sulfide-based composition, or a phosphate-based composition, and may be crystalline, partially crystalline, or amorphous. In certain embodiments, the inorganic phase may be doped to increase conductivity. Examples of solid lithium ion conducting materials include perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4x}A_{1-y}B_yS_4$, A is Si, Ge or Sn, B is P, Al, Zn, Ga; $Li_{10}SnP_2S_{12}$), garnets (e.g. $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3$—$Li_2SO_4$, $Li_2O$—$P_2O_5$, $Li_2O$—$SiO_2$), sulfide glasses or glass ceramics (e.g., $75Li_2S$-$25P_2S_5$, $Li_2S$—$SiS_2$, $LiI$—$Li_2S$—$B_2S_3$) and phosphates (e.g., $Li_{1-x}Al_xGe_{2-x}(PO_4)_3$(LAGP), $Li_{1+x}Ti_{2-x}Al_x(PO_4)$). Further examples include lithium rich anti-perovskite (LiRAP) particles. As described in Zhao and Daement, Jour J. Am. Chem. Soc., 2012, 134 (36), pp 15042-15047, incorporated by reference herein, these LiRAP particles have an ionic conductivity of greater than $10^{-3}$ S/cm at room temperature.

Examples of solid lithium ion conducting materials include sodium super ionic conductor (NASICON) compounds (e.g., $Na_{1+x}Zr_2Si_xP_{3-x}O_{12}$, $0<x<3$). Further examples of solid lithium ion conducting materials may be found in Cao et al., Front. Energy Res. (2014) 2:25 and Knauth, Solid State Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

According to various embodiments, an inorganic phase may include one or more types of inorganic ionically conductive particles. The particle size of the inorganic phase may vary according to the particular application, with an average diameter of the particles of the composition being between 0.1 μm and 500 μm for most applications. In some embodiments, the average diameter is between 0.1 μm and 100 μm. In some embodiments, a multi-modal size distribution may be used to optimize particle packing. For example, a bi-modal distribution may be used. In some embodiments, particles having a size of 1 μm or less are used such that the average nearest particle distance in the composite is no more than 1 μm. This can help prevent dendrite growth.

The inorganic phase may be manufactured by any appropriate method. For example, crystalline materials may be obtained using different synthetic methods such as sol-gel and solid state reactions. Glass electrolytes may be obtained by mechanical milling as described in Tatsumisago, M.; Takano, R.; Tadanaga K.; Hayashi, A. J. Power Sources 2014, 270, 603-607, incorporated by reference herein.

In certain embodiments, the inorganic phase is an amorphous glass material rather than a crystalline glass-ceramic material. For certain formulations of the solid-state composition, conductivity is significantly improved by use of an amorphous glass material. This is because crystalline and semi-crystalline ionically conductive particles can have anisotropic conductive paths, whereas amorphous materials have isotropic conductive paths. In some embodiments in which crystalline and semi-crystalline ionically conductive particles are used, sintering may be used to increase ionic conductivity.

Organic Phase

The organic matrix contains one or more types of polymers and may also be referred to as a polymer matrix. In some embodiments, the organic matrix may contain individual polymer chains without significant or any cross-linking between the polymer chains. In some embodiments, the organic matrix may be or include a polymer network characterized by nodes connecting polymer chains. These nodes may be formed by cross-linking during polymerization. In a cross-linked network, at least some of the nodes connect at least three chains. The organic matrix is formed by polymerization of a precursor in-situ in a mixture with the inorganic ionically conductive particles. The polymers of the organic matrix may be characterized by a backbone and one or more functional groups.

The organic matrix polymers have polymer backbones that are non-volatile. The polymer backbones do not interact too strongly with the inorganic phase, and may be characterized as non-polar or low-polar. In some embodiments, non-polar components are characterized by having a dielectric constant of less than 3 at all frequencies and low-polar components are characterized by having a dielectric constant between 3 and 5 at low frequency (60 Hz) and room temperature. In the description herein, polarity of a functionalized polymer component is determined by its backbone. For example, a non-polar polymer may have a non-polar linear polydimethylsiloxane (PDMS) backbone that is functionalized with polar end groups. Examples of non-polar backbones include polysiloxanes, polyolefins, polystyrene, and cyclic olefin polymers (COPs).

A COP is a polymer molecule or chain that includes multiple cyclic olefin monomers (e.g., norborene). COPs include cyclic olefin copolymers (COCs), which are produced by copolymerization of a cyclic olefin monomer with a monomer such as ethylene. Polyolefins include one, two, or more different olefin ($C_nH_{2n}$) monomers and only carbon and hydrogen as well as fully or partially saturated derivatives thereof.

Highly polar polymers such as polyvinylacetate and polyethylene oxide (PEO), are not effective polymer backbones as they may interact too strongly with the inorganic phase. Polymers that require highly polar solvents (e.g., polyvinylidene fluoride (PVDF)) may not be appropriate, as such solvents are incompatible with inorganic particles such as sulfide glasses.

For certain polymer classes such as polyvinyl, polyacrylamide, polyacrylic, and polymaleimide polymers, the polarity is highly dependent on the identity of their constituent monomers. While some such polymers (e.g., polyvinylacetate) may be too polar, it is possible that less polar polymers in these classes (e.g., poly(dodecyl-n-vinyl ether) may be used as backbones. Further, in some embodiments, these polymer classes may be included in a copolymer backbone along with a non-polar polymer (e.g., a polyolefin).

In some embodiments, the glass transition temperature of the polymer backbone is relatively low, e.g., less than about −50° C., less than about −70° C., less than about −90° C., or lower. In some embodiments, the polymer is an elastomer.

Specific examples of polymer backbones include PDMS ($T_g$ of −125° C.) and polybutadiene (PBD) ($T_g$ of −90° C. to −111° C.). Further examples include styrene butadiene rubbers (SBRs) ($T_g$ of −55° C.), ethylene propylene rubbers (EPRs) ($T_g$ of −60° C.), and isobutylene-isoprene rubbers (IIRs) ($T_g$ of −69° C.). The glass transition temperatures as provided herein are examples and may vary depending on the particular composition and/or isomeric form of the polymer. For example, the glass transition temperature of PBD can depend on the degree of cis, trans, or vinyl polymerization.

In some embodiments, the organic phase is substantially non-ionically conductive, with examples of non-ionically conductive polymers including PDMS, PBD, and the other polymers described above. Unlike ionically conductive polymers such as PEO, polypropylene oxide (PPO), polyacrylonitrile (PAN), poly(methyl methacrylate) (PMMA), which are ionically conductive because they dissolve or dissociate salts such as LiI, non-ionically conductive polymers are not ionically conductive even in the presence of a salt. This is because without dissolving a salt, there are no mobile ions to conduct in the organic phase.

Another class of polymers that may be used as backbones of the organic matrix polymers are perfluoropolyethers (PFPEs). A PFPE is a perfluorinated polymer molecule or chain including two or more ether groups. Examples include but are not limited to backbones such as difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or tetrafluoroethylene oxide-co-hexafluoropropylene oxide-co-difluoromethylene oxide and combinations thereof. See, e.g., U.S. Pat. No. 8,337,986, which is incorporated by reference herein for its teachings thereof. As described in *Compliant glass-polymer hybrid single ion-conducting electrolytes for lithium ion batteries*, PNAS, 52-57, vol. 113, no. 1 (2016), incorporated by reference herein, PFPEs are single ion-conductors for lithium in the presence of a salt.

Crystalline polymer backbones may also be characterized in terms of melting temperature Tm. Crystalline backbones may have a melting temperature less than about room temperature in some embodiments. In some embodiments, if the composite is heat processed (as described below), the melting temperature may be higher, e.g., less than 150° C., less than 100° C., or less than 50° C. For example, PDMS (Tm of −40° C.) may be preferred in some embodiments over polyethylene (PE; Tm of 120° C. to 180° C.) as the former is liquid at lower temperatures. Melting temperatures as provided herein are examples and may vary depending on the size, particular composition and/or isomeric form of the polymer. Melting temperatures of PBD, for example, vary significantly on the degree of cis, trans, or vinyl polymerization.

The polymers of the polymer matrix may be homopolymers or copolymers. If copolymers are used, both or all of the constituent polymers of the copolymers have the characteristics described above (non-volatile, non-polar or low-polar, etc.). Copolymers may be block copolymers, random copolymers, or graft copolymers.

The presence of the organic matrix in a relatively high amount (e.g., 2.5-60 wt % of the solid composites) can provide a composite material having desirable mechanical properties. According to various embodiments, the composite is soft and can be processed to a variety of shapes. In addition, the organic matrix may also fill voids in the composite, resulting in the dense material.

The organic matrix may also contain functional groups that enable the formation of polymerization in an in-situ polymerization reaction described below. Examples of end groups include cyano, thiol, amide, amino, sulfonic acid, epoxy, carboxyl, or hydroxyl groups. The end groups may also have surface interactions with the particles of the inorganic phase.

Polymer Precursors and In-Situ Polymerization

According to various embodiments, in-situ polymerization is performed by mixing ionically conductive particles, polymer precursors and any binders, initiators, catalysts, cross-linking agents, and other additives if present, and then initializing polymerization. This may be in solution or dry-pressed as described later. The polymerization may be initiated and carried out under applied pressure to establish intimate particle-to-particle contact.

The polymer precursors may be small molecule monomers, oligomers, or polymers. The polymerization reaction may form individual polymer chains from the precursors (or form longer polymer chains from polymeric precursors) and/or introduce cross-links between polymer chains to form a polymer network. A polymer precursor may include functional groups the nature of which depends on the polymerization method employed.

The polymer precursor may be any of the above polymer backbones described above (e.g., polysiloxanes, polyvinyls, polyolefins, PFPE's, COP's, or COC's, or other non-polar or low-polar polymers having relatively low $T_g$) or constituent monomers or oligomers thereof. Depending on the polymerization method, the polymer precursor may be a terminal- and/or backbone-functionalized polymer.

The reactivity of ionically conductive inorganic particles (and sulfide glasses in particular) presents challenges for in-situ polymerization. The polymerization reaction should be one that does not degrade the sulfide glass or other type of particle and does not lead to uncontrolled or pre-mature polymerization of the organic components. In particular, glass sulfides are sensitive to polar solvents and organic molecules, which can cause degradation or crystallization, the latter of which may result in a significant decrease in ionic conductivity. Methods employing metal catalysts are also incompatible with sulfide-based ionic conductors. The high content of the sulfur may result in catalyst poisoning, preventing polymerization. As such, methods such as platinum-mediated hydrosilation used for silicon rubber formation, may not be used.

Three methods that may be employed with appropriate selection of reaction chemistries are radical polymerization, condensation polymerization, and ring-opening polymerization. These are described below.

Free Radical Polymerization

Free radical polymerization can be employed using a broad range of functional polymers and small molecules, as it proceeds in presence of a variety of unsaturated bonds, including (meth)acrylates, (meth)acrylamides, alkenes, alkynes, vinyl groups, and allyl groups. Free radical polymerization can be triggered on demand using external stimuli to generate radicals from initiators. For example, a temperature-initiated radical polymerization can be applied under pressure to freeze the ionically conductive inorganic particles in place. The radical polymerization method involves a mixture of polymerizable components (also called polymer precursors) and a radical initiator. Free radical polymerization may also be referred to as chain-growth polymerization.

The radical initiator may be a thermally activated initiator (referred to as thermal initiator) or a photo-activated initiator (referred to as a photo-initiator). In some embodiments, the radical initiator is an organic azo initiator or a peroxide.

Organic azo initiators include, but are not limited to, 2,2'-azobis(isobutylnitrile), 2,2'-azobis(2,4-dimethylpentanenitrile), 2,2'-azobis(2,4-dimethylvaleronitrile), 2,2'-azobis(2-methylpropanenitrile), 2,2'-azobis(methylbutyronitrile), 1,1'-azobis(cyclohexanecarbonitrile), and 1,1'-azobis (cyanocyclohexane). Peroxides include, but are not limited to, benzoyl peroxide, decanoyl peroxide, lauroyl peroxide, di(n-propyl)peroxydicarbonate, di(sec-butyl)peroxydicarbonate, di(2-ethylhexyl)peroxydicarbonate, di(n-propyl)peroxydicarbonate, 1,1-dimethyl-3-hydroxybutyl peroxydocanoate, cumyl peroxyneoheptanoate, t-amyl peroxydecanoate, t-butyl peroxydecanoate, t-amyl peroxypivalate, t-butyl peroxypivalate, 2,5-dimethyl 2,5-di(2-ethylhexanoyl peroxy) hexane, t-amyl peroxy-2-ethylhexanoate, t-butyl peroxy-2-ethylhexanoate, t-butyl peroxyacetate, di-t-amyl peroxyacetate, t-butyl peroxide, di-t-amyl peroxide, t-amyl perbanzoate, and t-butyl perbanzoate.

In some embodiments, the polymer precursor is a functionalized polymer having a backbone as described above (e.g., a polysiloxane, polyolefin, PFPE, COP, backbone or other appropriate non-polar or low-polar polymer), or a constituent monomer or oligomer. Any unsaturated carbon-carbon bond may react to form higher molecular weight linear polymers or a cross-linked network. The latter is formed when two or more functional groups react. Examples of functional groups of the polymer precursors include, but are not limited to, maleic anhydride, acrylics including methacrylics, acrylamides including methacrylamides, styrenics, olefins, alkenes including cyclic alkenes, alkynes, vinyls, allyls, and maleimides.

FIG. 1 provides a schematic example of formation of a cross-linked network formed by radical polymerization. In FIG. 1, a radical initiator 1 (solid circle) and a functionalized polymer 2 (also called a polymer matrix precursor) react to form a cross-linked network. The functionalized polymer includes functional groups (hollow circle) at its terminal ends. The organic matrix may include various signatures indicating that it was formed in-situ by radical polymerization. These include reacted or unreacted functional groups as described above and radical initiators as described above.

An example of in-situ radical polymerization to form a solid composite material is provided below (see Example 1).

Step-Growth/Condensation Polymerization

In some embodiments, the in-situ polymerization is performed using step-growth polymerization. In some embodiments, the step-growth polymerization occurs by condensation and may also be referred to as condensation polymerization.

Figure 2:
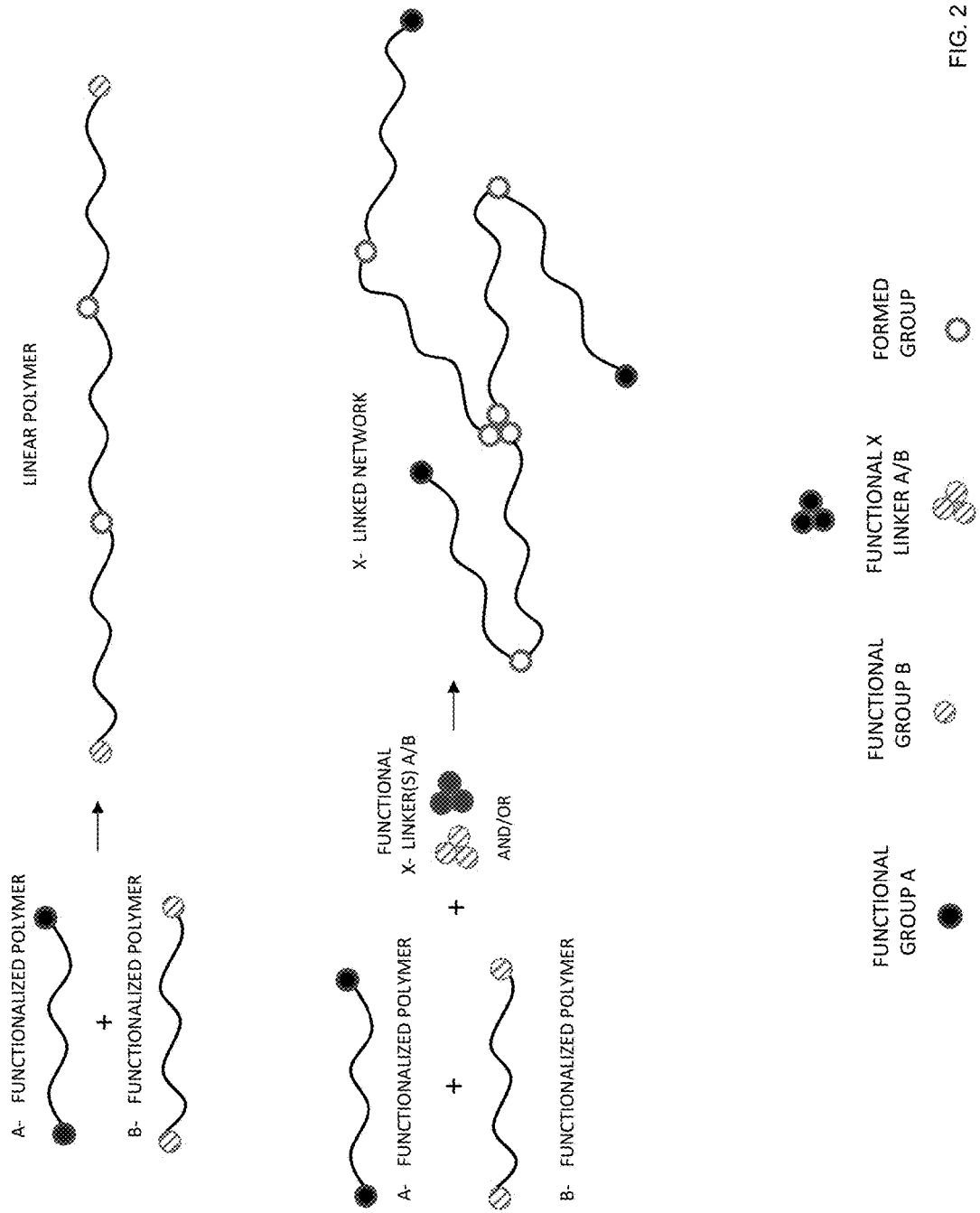
FIG. 2 provides schematic examples of formation of a linear polymer and a cross-linked polymer network by addition polymerization according to certain embodiments of the invention.

FIG. 2 provides schematic examples of formation of a linear polymer and a cross-linked polymer network by condensation polymerization. The two types of functional groups are labeled "A" and "B". Examples of functional group A include isocyanates and blocked isocyanates. Examples of blocking agents include phenols, oximes, and secondary amines. Examples of functional group B include amines (which form poly(urea-urethanes)), alcohols (which form polyurethanes), and thiols (which form polythiourethanes). As such, the groups formed may be urea-urethanes, urethanes, or thiourethanes.

Higher molecular weight linear polymers are formed when functionalized polymers of type A and type B are reacted. As also shown in FIG. 2, a cross-linked polymer network may be formed using multi-functional cross-linkers.

The organic matrix may include various signatures indicating that it was formed in-situ by condensation polymerization. These include unreacted functional groups as described above and formed urea-urethane, urethane, and thiourethane groups as described above.

There are several challenges to using condensation polymerization to fabricate the composite materials described herein. First, any byproducts should not react with the inorganic phase of the composite. For example, condensation polymerization between acids or acid halogens and alcohols, amines or thiols form water and acid byproducts that may react with sulfide glasses. Condensation polymerization may be performed if the polymerization proceeds with no byproducts or forms only non-reactive byproducts.

Another challenge with condensation polymerization is that, unlike radical polymerization, it is spontaneous. The condensation polymerization reactions proceed with polymer precursors (i.e., monomers, oligomers, or polymers) functionalized with two different types of functional groups that react with each other. As such, for in-situ polymerization, one or both of the functional groups should be blocked. The reaction may then be initiated by unblocking thermally reactive components.

Polyurethane polymerization reactions of isocyanates or blocked isocyanates with alcohols, amines or thiols occur without negative effects on sulfide glasses. According to various embodiments, polyurethanes, poly(urethane-ureas), and polythiourethanes polymers are formed through polycondensation reactions between components that may be one or more of polymerizable monomers, functional polymers and/or oligomers, and chain extenders and cross-linkers. The reaction typically occurs between isocyanates or blocked isocyanates and one or more second reactive components, such as alcohols, amines or thiols.

Examples of isocyanates include aromatic isocyanates (e.g., diphenylmethane diisocyanate (MDI), p-phenylene diisocyanate (PPDI), toluene diisocyanate (TDI)), aliphatic isocyanates (e.g., hexamethylene diisocyanate (HDI) and isophorone diisocyanate (IPDI)), and other isocyanate-functionalized polymers, oligomers, and prepolymers.

Blocked isocyanates are typically formed by the reaction of an isocyanate with a compound containing an active hydrogen, including, but not limited to alcohols, phenols, lactams (e.g., ε-caprolactam), oximes (e.g., ketoximine), hydroxylamines, pyrazoles, hydroxypyridines, triazloes, imidazolines, formate, diacetone, secondary amines (e.g., diisopropyl amine and t-butyl benzyl amine) and methylene compounds such as malonic esters.

Examples of chain extenders include glycols, diols, and hydroxy amines. Specific examples include ethylene glycol, propylene glycol, triethylene glycol, tetraethylene glycol, propylene glycol, dipropylene glycol, 1,3-propanediol, 1,3-butanediol, 1,4-butanediol, neopentyl glycol, 1,6-hexanediol, 1,4-cyclohexanedimethanol, ethanolamine, diethanolamine, methyldiethanolamine, phenyldiethanolamine, 4,4'-ethylene dianiline, dimethylthiotoluenediamine, diethyl toluene diamine, 4,4'-methylene-bis-2,6-diethyl aniline, and m-xylene diamine.

Examples of cross-linkers include isocyanate cross-linkers, multifunctional alcohols, amines, and hydroxy amines. Specific examples include glycerol, trimethylolpropane, 1,2,6-hexanetriol, triethanolamine, tetraerythritol, and N,N,N'N"-tetrakis(2-hydroxypropyl)ethylenediamine.

In some embodiments, a mixture of components containing blocked isocyanates undergoes polymerization only at elevated temperatures, as thermal dissociation, and hence release of the blocking agent and reactive isocyanate groups, occurs.

An example of condensation polymerization to form a solid composite material is provided below (see Example 2).

Ring Opening Polymerization

Ring opening polymerization processes are based on the use of nucleophiles such as amines, alcohols and thiols to ring open epoxy-terminated polymers or small molecules, and form chemical bonds and/or cross-links. For the composite materials described herein, the process may be limited by a catalytic effect of sulfide glass on ring-opening of epoxy-terminated molecules. The catalysis may induce a spontaneous and premature polymerization. To control polymerization, blocked functional groups or functional groups having relatively low reactivity may be employed. For example, sterically hindered epoxides, such as epoxycyclohexane, or bulkier, less reactive nucleophiles, as secondary or tertiary alcohols or secondary amines with bulky substituents can be used.

Figure 3:
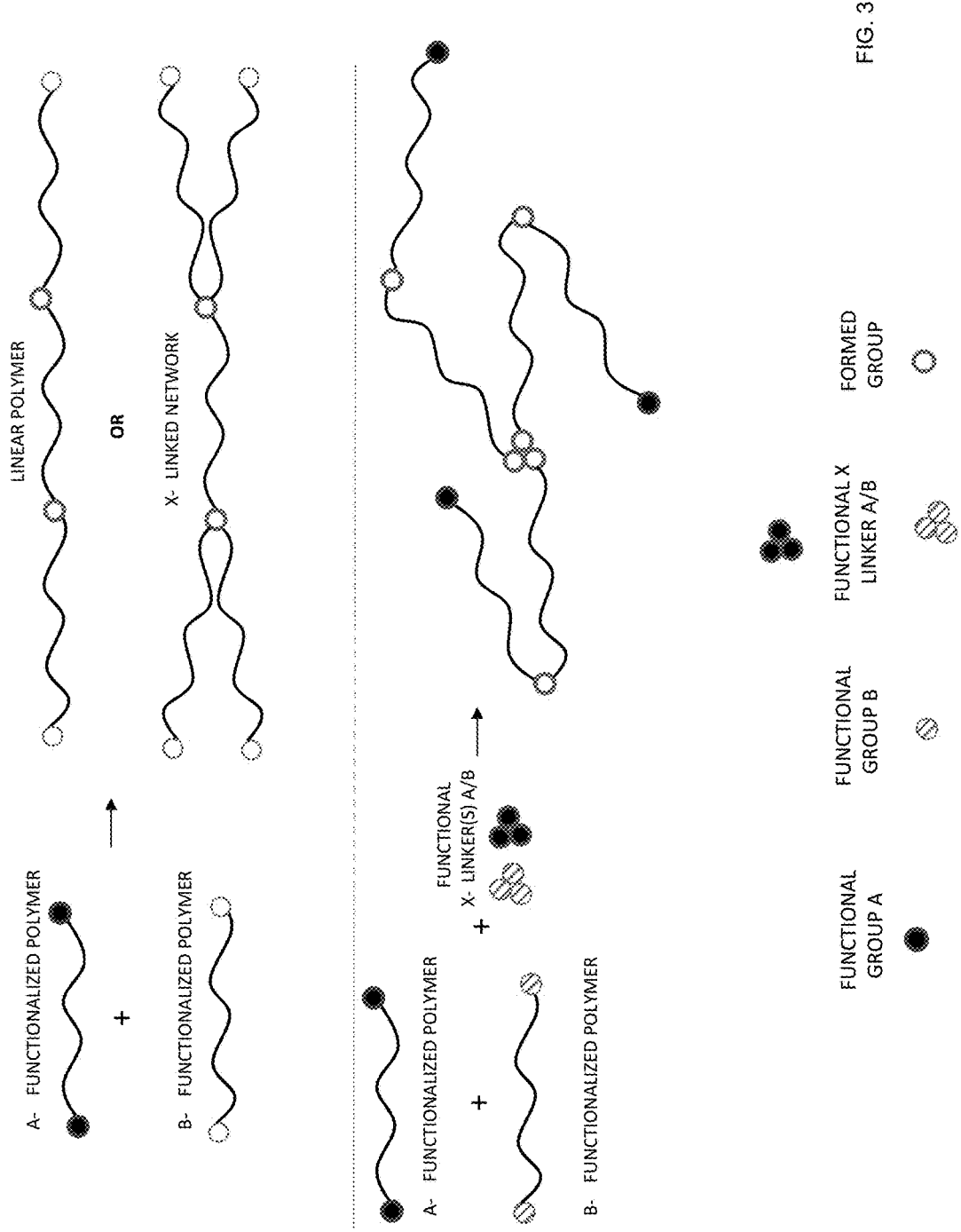
FIG. 3 provides schematic examples of formation of a linear polymer and cross-linked polymer networks by ring-opening polymerization according to certain embodiments of the invention.

The ring opening polymerization reactions proceed with polymer precursors (i.e., monomers, oligomers, or polymers) functionalized with two different types of functional groups that react with each other. FIG. 3 provides schematic examples of formation of a linear polymer and cross-linked polymer networks by ring-opening polymerization. The two types of functional groups are labeled "A" and "B". A one-proton functional group A may be used to form linear polymers, with examples including alcohols, secondary amines, and thiols. A two-proton functional group A may be used to form cross-linked networks with examples including primary amines. Examples of functional group B include epoxy resins, oxiranes, glycidyl groups, and alkene oxides. As shown, cross-linked polymer networks may also be formed with functional cross-linkers. Examples of functional cross-linkers include multi-functional (greater or equal to 3) small molecules, amines, alcohols, thiols, and oxiranes. The formed group is a cured epoxy resin.

In some embodiments, the in-situ polymerization is an epoxide polymerization. Epoxy resins include epoxide-functionalized polymers, oligomers, and prepolymers, or a mixture of thereof. The epoxy-functionalities include glycidyl, oxides of cyclic alkene (e.g., epoxycyclohexyl), and oxiranes. Examples of epoxy prepolymers include bisphenol A, bisphenol F and novolac as well as linear and cyclic aliphatic epoxy resins, such as butanediol diglycidyl ether, hexanediol diglycidyl ether, trimethylpropane triglycidyl ether, and 3,4-epoxycyclohexylmethyl-3,4-epoxycyclohexane carboxylate.

The functional epoxy resins are cured (cross-linked) through either a catalytic homopolymerization or reaction with hardeners/curatives. The hardeners include multifunctional aliphatic, cycloaliphatic, and aromatic amines (e.g., diethylenetriamine, triethylenetetramine, tetraethylenepentamine, diproprenediamine, di ethylaminopropylamine, hexamethylenediamine, N-aminoethylpiperazine, menthane diamine, isophoronediamine, m-xylenediamine, metaphenylene diamine, and diaminodiphenylmethane), polyamide resins, alcohols, thiols, polythiols, polysulfide resins, phenols, acids, and acid anhydrides (e.g., phthalic, trimellitic, pyromellitic, maleic, tetrahydrophthalic, methyltetrahydrophthalic, dodecenyl succinic, hexahydrophthalic, and succinic anhydrides). The catalytic homopolymerization of epoxy resin may occur in presence of anionic catalysts, such as tertiary and secondary amines (e.g., piperidine, N,N-dimethylpiperidine, benzyldimethylamine) and imidazoles (e.g., 2-methylimidazole and 2-ethyl-4-methylimidazole) or in the presence of cationic catalysts, like boron trifluoride. In some embodiments, the reaction is catalyzed by lithium sulfide glass. The epoxy resins shrink during the curing process, with the shrinkage typically about 3-10%. Shrinkage occurs at the gel point and increases with increasing gelation of the resin.

The organic matrix may include various signatures indicating that it was formed in-situ by ring opening polymerization. These include unreacted functional groups as described above and epoxy resins.

An example of in-situ ring opening polymerization to form a solid composite material is provided below (see Example 4).

Polymer Binder

In some embodiments, the solid composite materials include a high molecular weight polymer binder as part of the polymer matrix described above. The presence of a small amount of a polymer binder can improve processability, for example, turning a powdery mixture into a castable thin film. In some embodiments, a binder may be added prior to processing steps such as casting, extruding, or laminating the film to provide mechanical strength to the material before the film undergoes thermally activated or ultraviolet-activated in-situ polymerization.

The polymer binder is a high molecular weight (at least 100 kg/mol) polymer. In some embodiments, the polymer binder has a non-polar backbone. Examples of non-polar polymer binders include polymers or copolymers including styrene, butadiene, isoprene, ethylene, and butylene. Styrenic block copolymers including polystyrene blocks and rubber blocks may be used, with examples of rubber blocks including PBD and polyisoprene. The rubber blocks may or may not be hydrogenated. Specific examples of polymer binders are styrene ethylene butylene styrene (SEBS), styrene-butadiene-styrene (SBS), styrene-isoprene-styrene (SIS), styrene-butadiene rubber (SBR), PSt, PBD, polyethylene (PE), and polyisoprene (PI).

The backbone may be the same or different than the backbone formed by the functionalized polymers described above. The high molecular weight polymer is not functionalized or has end groups (such as methyl end groups) that do not interact with the inorganic phase.

If present, the amount of polymer binder in the solid composite material may be limited to maintain conductivity. According to various embodiments, the polymer binder is between 0.5% and 5% by weight of the composite. In some embodiments, the polymer binder is between 0.5% and 4% by weight of the composite, between 0.5% and 3% by weight of the composite, between 0.5% and 2.5% by weight of the composite, between 0.5% and 2% by weight of the composite, or between 0.5% and 1.5% by weight of the composite.

If present, the polymer binder is generally not covalently bonded to the in-situ polymerized linear polymers or cross-linked polymer network.

Composite Materials

The solid-state compositions described herein generally include an inorganic solid phase and an organic polymer matrix as described above. The compositions may depend in part on the application, with example applications including solid-state electrolytes and solid-state electrodes.

Loading refers to weight percent or volume percent that a component occupies in the composition or part thereof. In the description herein, loadings are provided as weight percentages. The organic matrix, including the in-situ polymerized precursor and a polymer binder (if present), may fill the space between the inorganic particles such that there is no or minimal void space in the composition and has desirable mechanical properties. If the loading is too high, however, it can reduce conductivity. The total polymer loading in a solid-state composite may be between 2.5% and 60%, by weight.

According to various embodiments, the polymer matrix loading in the composites is relatively high, being at least 2.5%, at least 5%, at least 10%, at least 11%, at least 12%, at least 13%, at least 14%, at least 15%, at least 16%, at least 17%, at least 18%, at least 19%, at least 20%, at least 22%, at least 24%, at least 26%, at least 28%, at least 30%, at least 32%, least 40%, at least 45%, or at least 50%, in each case by weight. The total polymer loading in the composite material does not exceed 60% by weight.

According to various embodiments, the composite material may include unreacted reactants and byproducts of the in-situ polymerization reaction. These will depend on the reactants and type of polymerization reaction employed, and may be used as a signature to identify if the composite was formed via an in-situ polymerization reaction.

In some embodiments, the solid-state compositions consist essentially of inorganic ionically conductive particles and a polymer matrix, along with any unreacted reactants and byproducts of an in-situ polymerization reactant. The polymer matrix consists essentially of the polymerized product of an in-situ polymerization reaction in some embodiments. In some embodiments, the polymer matrix consists essentially of the polymerized product of an in-situ polymerization reaction and a high molecular weight polymer binder.

In alternative embodiments, one or more components other than the inorganic ionically conductive particles, one or more first components, and one or more polymer binders may be added to the solid-state compositions. According to various embodiments, the solid-state compositions may or may not include an added salt. Salts such as lithium salts (e.g., $LiPF_6$, LiTFSI), potassium salts, and sodium salts may be added to improve conductivity. However, in some embodiments, they are not used with the contacting ionically conductive particles responsible for all of the ion conduction. In some embodiments, the solid-state compositions include substantially no added salts. "Substantially no added salts" means no more than a trace amount of a salt. In some embodiments, if a salt is present, it does not contribute more than 0.05 mS/cm or 0.1 mS/cm to the ionic conductivity. In some embodiments, the solid-state composition may include one or more conductivity enhancers. In some embodiments, the electrolyte may include one or more filler materials, including ceramic fillers such as Al$_2$O$_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application. In some embodiments, discussed further below, the solid-state compositions include electrochemically active material.

In some embodiments, the solid-state composites have a modulus of at least about 9 GPa (about 2.5× the modulus of lithium metal) to prevent the growth of lithium dendrites when used as an solid electrolyte. The composites may be microscopically dense and compliant and can be processed to different shapes (for example, pellets).

The solid-state composites may be characterized by having high ionic conductivity. In some embodiments, the conductivity is close to that of the pristine ion conductor particles, for example, and may be characterized as a percentage of that of the pristine particles, e.g., at least 10%, 50%, or 70% of the pristine ion-conductor particles. The solid-state composites may also be characterized as having ionic conductivity of at least $1.0 \times 10^{-4}$ S/cm.

The polymers of the organic matrix may be characterized by a backbone as described above. In some embodiments, the polymers may include one or more different types of functional groups that may be attached to the terminal ends of polymer matrix precursors (e.g., for polymerization or interaction with the inorganic phase) and/or attached along various points of the backbone of a polymer matrix precursor (e.g., for cross-linking). Further, in some cases, unreacted reactants including functional groups may be present in the organic phase, as part of functionalized polymers, or functional cross-linkers or chain extenders.

Examples of functional groups include a primary amine functional group (—NH$_2$) a secondary amine functional group (—NRH, where R is alkyl or aryl), an alcohol functional group (—OH), a thiol functional group (—SH), an isocyanate functional group (—N=C=O), an alkenyl functional group (—RC=CR$_2$, where each R is individually H, alkyl, or aryl), an alkynyl functional group (—C≡CR, where R is H, alkyl, or aryl), a vinyl functional group (—CH=CH$_2$), and an allyl functional group (—CH$_2$—CH=CH$_2$). The attachment point to the backbone is indicated by "—".

Further examples include a (meth)acrylate functional group, (meth)acrylamide functional group, a styrenic functional group, and a maleimide functional group as shown below, where R is H, alkyl, or aryl and ∿ indicates the attachment point to the backbone.

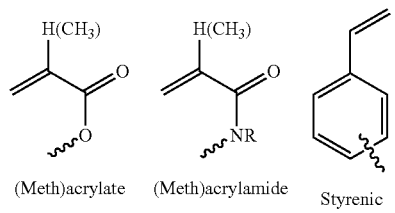

(Meth)acrylate   (Meth)acrylamide   Styrenic

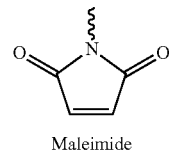

Maleimide

Once reacted, the above functional groups may form linking groups (also referred to as linkers) in an in-situ polymerized matrix. As such, an in-situ polymerized matrix may be characterized by the presence of one or more of the following:

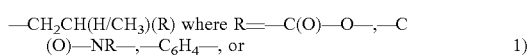   1)

—CH$_2$CH(H/CH$_3$)(R) where R=—C(O)—O—,—C(O)—NR—,—C$_6$H$_4$—, or

[structure with N, O, HC—CH ring];

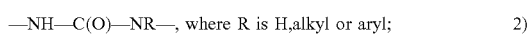 —NH—C(O)—NR—, where R is H, alkyl or aryl;   2)

 —NH—C(O)—O—; and   3)

 —NH—C(O)—S—.   4)

These linking groups may attached to a backbone or all or part of a chain extending or cross-linking group.

Figure 14:
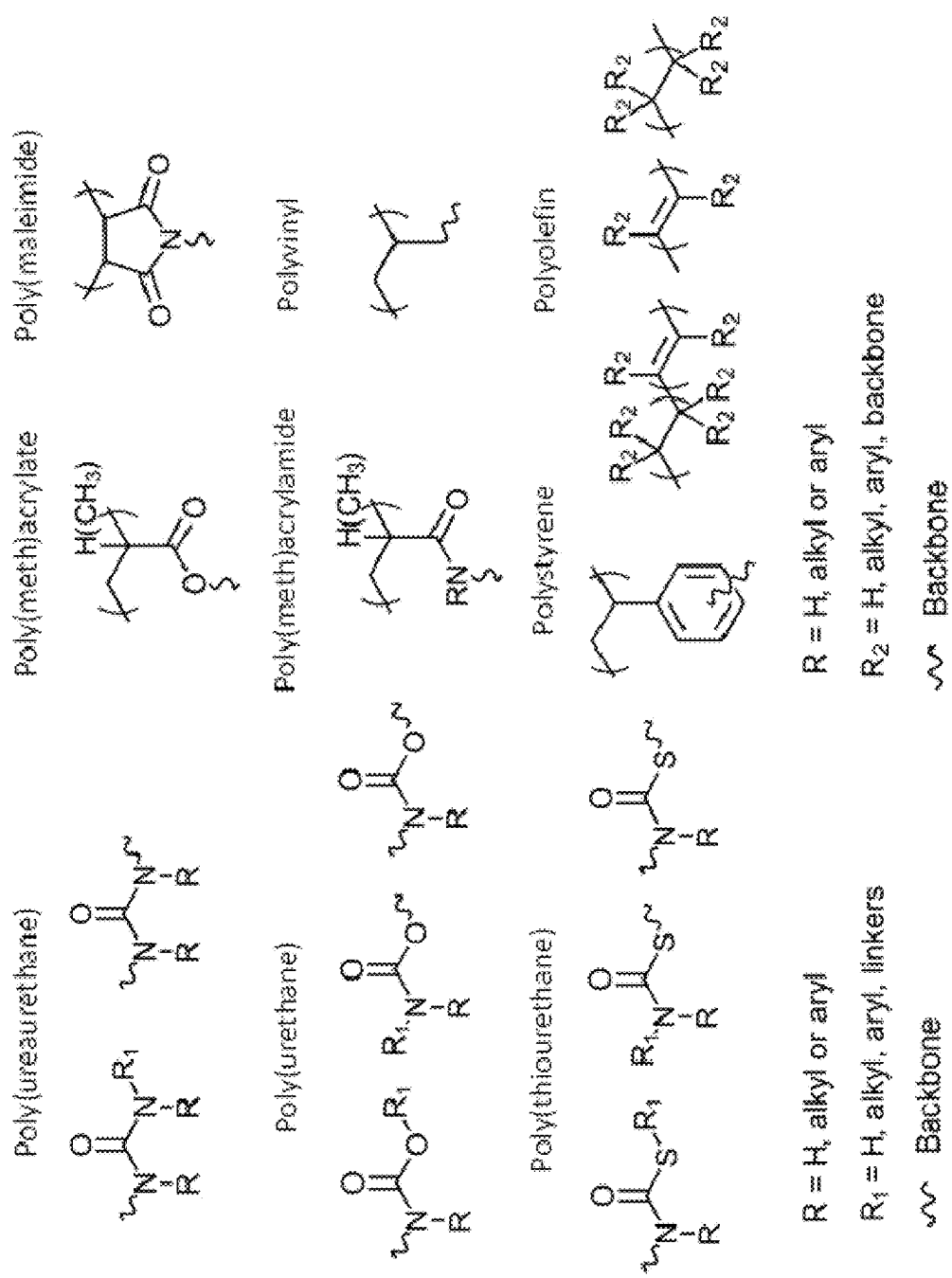
FIG. 14 shows examples of polymers that may be in an organic matrix of a composite material according to certain embodiments.

The polymer matrix may be characterized as the product of the in-situ polymerization reaction or reactions used to form it as described above. For example, a poly(urethane) may be formed by reaction of an isocyanate with an alcohol. In some embodiments, the polymer matrix includes a poly(urethane), a poly(ureaurethane), poly(thiourethane), a poly(acrylate), a poly(methacrylate), a poly(maleimide), poly(acrylanmide), a poly(methacrylamide), a polyolefin, or a polystyrene. FIG. 14 provides examples of these polymers in an in-situ polymerized polymer matrix.

Processing

The solid-state compositions may be prepared by any appropriate method with example procedures described below with reference to the Experimental results. Uniform films can be prepared by solution processing methods. In one example method, all components are mixed together by using various laboratory and industrial equipment such as sonicators, homogenizers, high-speed mixers, rotary mills, vertical mills, and planetary ball mills. Mixing media can be added to aid homogenization, by improving mixing, breaking up agglomerates and aggregates, thereby eliminating film imperfection such as pin-holes and high surface roughness. The resulting mixture is in a form of uniformly mixed slurry with a viscosity varying based on the hybrid composition and solvent content. The substrate for casting can have different thicknesses and compositions. Examples include aluminum, copper and mylar. The casting of the slurry on a selected substrate can be achieved by different industrial methods. In some embodiments, porosity can be reduced by mechanical densification of films (resulting in, for example, up to about 50% thickness change) by methods such as calendaring between rollers, vertical flat pressing, or isostatic pressing. The pressure involved in densification process forces particles to maintain a close inter-particle contact. External pressure, e.g., on the order of 1 MPa to 300 MPa, or 1 MPa to 100 MPa, is applied. In some embodiments, pressures as exerted by a calendar roll are used. The pressure is sufficient to create particle-to-particle contact, though kept low enough to avoid uncured polymer from squeezing out of the press. Polymerization, which may include cross-linking, may occur under pressure to form the matrix. In some implementations, a thermal-initiated or photo-initiated polymerization technique is used in which application of thermal energy or ultraviolet light is used to initiate polymerization. The ionically conductive inorganic particles are trapped in the matrix and stay in close contact on release of external pressure. The composite prepared by either of the above methods (pellets or thin films) is incorporated to an actual solid-state lithium battery by well-established methods.

In some embodiments, the films are dry-processed rather than processed in solution. For example, the films may be extruded. Extrusion or other dry processing may be alternatives to solution processing especially at higher loadings of the organic phase (e.g., in embodiments in which the organic phase is at least 30 wt %).

Figure 4A:
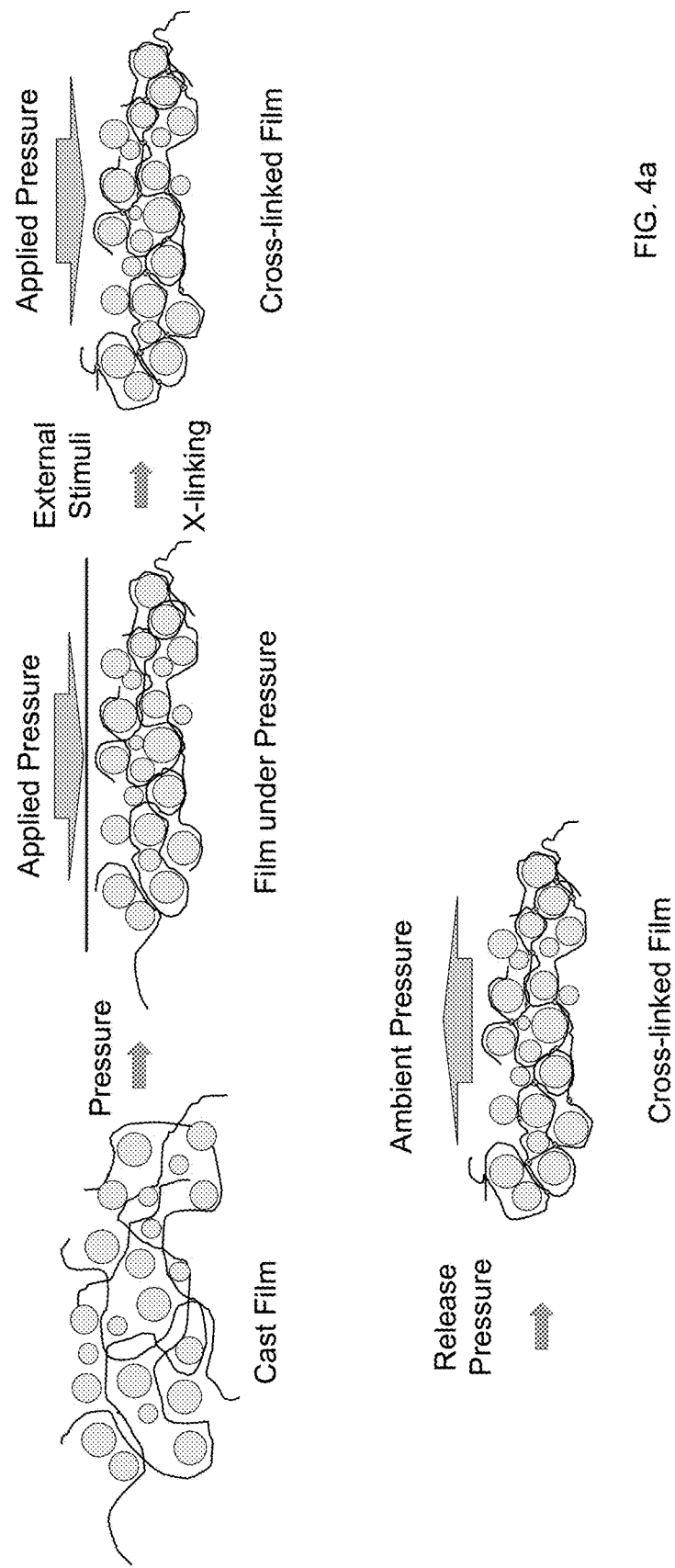
FIG. 4a provides an example of a schematic depiction of a cast film including ionically conductive inorganic particles in a polymer matrix undergoing in-situ polymerization according to certain embodiments of the invention to cross-link the polymer chains under applied pressure.

FIG. 4a provides an example of a schematic depiction of a cast film including ionically conductive inorganic particles in a polymer matrix undergoing in-situ polymerization to cross-link the polymer chains under applied pressure. In the example of FIG. 4, the cast film is subject to an applied pressure that densifies the film and forces the ionically conductive particles into close contact. An external stimulus is applied to initiate polymerization, which in the example of FIG. 4, cross-links polymer chains of the polymer matrix to form a polymer network. The pressure is released, with the cross-linked film remaining dense with the ionically conductive particles into close contact. In alternate embodiments, the organic matrix includes polymers without any cross-linking. Further, as indicated above, in some embodiments, the film is not cast.

FIG. 4b provides an example of a schematic depiction of a cast film including ionically conductive inorganic particles in a polymer matrix undergoing in-situ polymerization according to certain embodiments of the invention to cross-link the polymer chains without applied pressure. In these embodiments, the film undergoes sufficient contraction due to the in-situ polymerization itself that particle-to-particle contact and increase in ionic conductivity occurs. The level of contraction for a particle polymerization depends on several factors, including the type of polymerization, the volume of organic matrix in the composite, and the type and number of polymerizable groups in the pre-polymerized composites. With respect to type of polymerization, step-growth polymerization undergoes more volume change than chain-growth polymerization, which undergoes more volume change than ring opening polymerization. For the cross-linked systems described above, the largest contraction would result from step-growth polymerization such as polyurethane polymerization with blocked isocyanates, followed by a chain-growth polymerization such as radical polymerization (e.g., PBD cross-linking, PFPE or PDMS diacrylate crosslinking), followed by ring-opening polymerization such as an epoxy-cured matrix. Higher organic matrix volume percentages and lower inorganic particle volume percentages also lead to more contraction. Finally, the more functional groups that are converted during polymerization, the more the film will contract.

In some embodiments, dual-cure methods are provided. In such methods, two reactants that polymerize at different temperatures are provided. For example, in a step-growth polymerization a monomer that forms only higher molecular weight linear polymers (i.e., a difunctional or N=2 monomer) may polymerize at 100° C., and a functional cross-linker that has three functional groups (N=3) may polymerize at 180° C. The polymer formed with N=2 monomer may be a thermoplastic, and can be re-shaped under temperature and pressure, whereas the N=3 functional cross-linker may a thermoset that cannot be re-shaped. Thus, a first in-situ processing operation at 100° C. may be performed to hold the composite together with a subsequent in-situ processing operation performed at 180° C. to cross-link the composite in its final form. The first cure can provide mechanical strength to the material before the film undergoes thermally activated or ultraviolet-activated in-situ polymerization in some embodiments. An example of a dual cure system including a difunctional monomer (isophorone diisocyanate-diisopropylamine (IPDI-DIPA)) and blocked trifunctional isocyanate (poly[(phenyl isocyanate)-co-formaldehyde] PPFI-DIPA) for in-situ polyurethane formation is described is provided below in Example 9.

In some embodiments, a higher molecular weight thermoplastic polymer can be pre-polymerized ex-situ and then mixed with the ionically conductive particles. This may be done instead of polymerizing N=2 monomers in-situ, for example. The higher molecular weight thermoplastic may be prepared by reacting a backbone polymer with isocyanate as described above.

Electrolytes

In one aspect of the invention, solid-state composite electrolytes are provided. The solid-state composite electrolytes may be any of the solid-state composite material described above. The electrolyte may be formed directly on a functional substrate, such as an electrode, or formed on a removable substrate that is removed before assembling the solid-state electrolyte to other components of a battery.

In some embodiments, solid-state composite electrolytes consisting essentially of a polymer matrix and the ionically conductive inorganic particles, along with any unreacted reactant or byproduct, as described above are provided. However, there may be other components of the electrolytes as described above. In some such embodiments, the polymerized precursor, the high molecular weight polymer binder (if present), ionically conductive inorganic particles, and any unreacted reactant or byproduct (if present) constitute at least 90% by weight of the solid-state composite electrolyte, and, in some embodiments, at least 95% by weight of the solid-state composite electrolyte.

In some embodiments, ionically conductive amorphous inorganic particles constitutes at least 60% by weight of the solid-state electrolyte. In some such embodiments, the balance of the solid-state electrolyte is the polymer matrix and any unreacted reactant and byproduct. In some embodiments, ionically conductive amorphous inorganic particles constitutes at least 80% by weight of the solid-state electrolyte. In some such embodiments, the balance of the solid-state electrolyte is the polymer matrix and any unreacted reactant and byproduct. In some embodiments, ionically conductive amorphous inorganic particles constitutes at least 85% by weight of the solid-state electrolyte. In some such embodiments, the balance of the solid-state electrolyte is the polymer matrix and any unreacted reactant and byproduct.

Other components can include alkali metal ion salts, including lithium ion salts, sodium ion salts, and potassium ion salts. Examples include $LiPF_6$, LiTFSI, LiBETI, etc. However, in some embodiments, the solid-state electrolytes are substantially free of alkali metal ion salts.

In some embodiments, the electrolyte may include an electrode stabilizing agent that can be used to form a passivation layer on the surface of an electrode. Examples of electrode stabilizing agents are described in U.S. Pat. No.

9,093,722. In some embodiments, the electrolyte may include conductivity enhancers, fillers, or organic components as described above.

The composite solid-state electrolytes may be used in any solid-state alkali-ion or alkali-metal battery, including lithium-ion batteries, sodium-ion batteries, lithium-metal batteries, and sodium-metal batteries. The composite solid-state electrolytes are well-suited for batteries in which dendrite growth is a concern. For example, in some embodiments, an electrolyte for a lithium metal battery is provided. The composite solid-state electrolytes enable the use of lithium metal anodes by resisting dendrites. The composite solid-state electrolytes may be used with any cathode material, including sulfur cathodes. The organic phase components described above do not dissolve polysulfides and are suited for use with lithium-sulfur batteries.

A solid film electrolyte composition of the present invention may be of any suitable thickness depending upon the particular battery design. For many applications, the thickness may be between 10 microns and 250 microns, for example 100 microns. In some embodiments, the electrolyte may be significantly thicker, e.g., on the order of millimeters.

Example loadings for solid-state composite electrodes according to embodiments of the present invention are given below in Table 1.

binder. The loadings do not consider unreacted reactants or byproducts—that is, unreacted reactants or byproducts, which may be present in trace or greater amounts, are not included in the loadings. For compositions that do not include a high molecular weight polymer binder, the high end of each example range for the polymerized precursor (99%) is replaced by 100%, with the low end of each example range for the binder (1%) replaced by 0.

Electrodes

In one aspect of the invention, electrodes including the solid-state composites are provided. The solid-state composites further include an electrode active material, and optionally, a conductive additive. In embodiments in which a high molecular weight binder is present, the high molecular weight polymer binder may constitute between 1% and 50% by weight of the organic phase, with the polymerized precursor constituting at least 50% by weight of the organic phase. The organic phase consists essentially of an in-situ polymerized precursor, an optional high molecular weight polymer binder, and any unreacted reactant and byproduct that may be present according to some embodiments. In other embodiments, it may include one or more additional components as described above. Example loadings of

TABLE 1

Example Loadings for Solid-State Composite Electrolytes

|  |  | Examples | % Weight of Total |  |
|---|---|---|---|---|
| Inorganic phase | Inorganic ionically conductive particles | Sulfide glass | 40%-97.5% 40%-90% 65%-90% |  |

|  |  | Examples | % Weight of organic phase |  |
|---|---|---|---|---|
| Organic Phase | Polymerized precursor | HLBH, LBH, PDMS | 50%-99% 80%-99% 95%-99% | 2.5%-60% 10%-60% 10%-35% |
|  | High molecular weight polymer binder | SEBS, SBS, SIS, SBR, 100 kg/mol and above, and mixtures thereof | 1%-50% 1%-20% 1%-5% |  |

Table 1 provides loadings for compositions for which the organic matrix includes a high molecular weight polymer embodiments of the present invention are given below in Table 2.

TABLE 2

Example Loadings for Solid-State Composite Electrodes

|  |  | Examples | % Weight of powder | % Weight of Total |
|---|---|---|---|---|
| Inorganic phase - electrode powder | Active Material | Li$_2$S, LCO, NCA, graphite, silicon, sulfur | 30-80% 30-50% | 85-97% |
|  | Conductive Additive | Activated carbon | 5-25% 10-20% |  |
|  | Inorganic ionically conductive particles | Sulfide glass | 15-60% 30-50% |  |

TABLE 2-continued

Example Loadings for Solid-State Composite Electrodes

| | Examples | % Weight of organic phase | |
|---|---|---|---|
| Organic Phase | Polymerized precursor | HLBH, LBH, PDMS | 50%-99% 80%-99% 95%-99% | 3-15% |
| | High molecular weight polymer binder | SEBS, SBS, SIS, SBR, 100 kg/mol and above, and mixtures thereof | 1-50% 1%-20% 1%-5% | |

Table 2 provides loadings for compositions for which the organic matrix includes a high molecular weight polymer binder. Unreacted reactants or byproducts, which may be present in trace or greater amounts, are not included in the loadings. For compositions that do not include a high molecular weight polymer binder, the high end of each example range for the polymerized precursor (99%) is replaced by 100%, with the low end of each example range for the binder (1%) replaced by 0.

In some embodiments, the solid-state electrodes are cathodes including an in-situ polymerized polymer matrix, inorganic ionically conductive particles, and an active material. In some embodiments, the solid-state electrodes are anodes including an in-situ polymerized polymer matrix, inorganic ionically conductive particles, and an active material.

Example cathode active materials include lithium cobalt oxide (LCO), lithium manganese oxide (LMO), lithium nickel cobalt aluminum oxide (NCA), lithium iron phosphate (LFP), and lithium nickel cobalt manganese oxide (NCM). Example anode active materials include graphite and other carbon-containing materials, silicon and silicon-containing materials, tin and tin-containing materials, lithium and lithium alloyed metals.

In some embodiments, the solid-state electrodes are sulfur cathodes including an in-situ polymerized polymer matrix, inorganic ionically conductive particles, and sulfur-containing active material. In some embodiments, the composite solid-state cathodes are incorporated into lithium-sulfur batteries with the composite solid-state cathodes including a an in-situ polymerized polymer matrix, an optional high molecular weight polymer binder, inorganic ionically conductive particles, lithium sulfide ($Li_2S$) particles, and a carbon conductive material.

According to various embodiments, the solid-state electrodes are thin films having thicknesses of less than 200 microns, and in some embodiments, less than 100 microns. The areal capacity may be between 1 $mAh/cm^2$ and 10 $mAh/cm^2$ n some embodiments.

In one aspect of the invention, electrode/electrolyte bilayers that include the solid-state composite compositions are provided. The bilayers include a solid-state composite electrode and a solid-state composite electrolyte as described above. Each of the ionically conductive inorganic particles, the in-situ polymerized polymer matrix, and the high molecular weight polymer binder (if present) may be independently selected for the electrode and the electrolyte, such that each component of the electrode may be the same or different as that in the electrolyte. The solid-state electrodes are thin films having thicknesses of less than about 200 microns, and in some embodiments, less than about 100 microns. The solid-state electrolyte, which contacts the solid-state electrode, may have a thickness of less than about 200 microns. In some embodiments, it is between 5 microns and 50 microns thick, e.g., between 25 microns and 50 microns thick.

Battery

Provided herein are alkali metal batteries and alkali metal ion batteries that include an anode, a cathode, and a compliant solid electrolyte composition as described above operatively associated with the anode and cathode. The batteries may include a separator for physically separating the anode and cathode.

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, sulfur and combinations thereof. In some embodiments, the cathode may be a sulfur cathode. Additional examples of cathodes include but are not limited to those described in Zhang et al., US Pat. App. Pub No. 2012/0082903, at paragraph 178, which is incorporated by reference herein. In some embodiments, an electrode such as a cathode can contain a liquid, such as described in Y. Lu et al., *J. Am. Chem. Soc.* 133, 5756-5759 (2011), incorporated by reference herein.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

In some embodiments, lithium-sulfur cells are provided, including lithium metal anodes and sulfur-containing cathodes. As noted above, the solid-state composite electrolytes described herein uniquely enable both a lithium metal anode, by preventing dendrite formation, and sulfur cathodes, by not dissolving polysulfide intermediates $Li_2S_n$ that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

As described above, in some embodiments, the solid composite compositions may be incorporated into an electrode of a battery. The electrolyte may be a compliant solid electrolyte as described above or any other appropriate electrolyte, including liquid electrolyte.

In some embodiments, a battery includes an electrode/electrolyte bilayer, with each layer incorporating the ionically conductive solid-state composite materials described herein.

Figure 15:
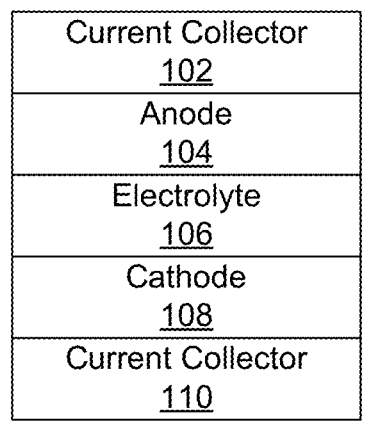
FIGS. 15-17 show examples of schematics of cells according to certain embodiments of the invention.
Figure 16:
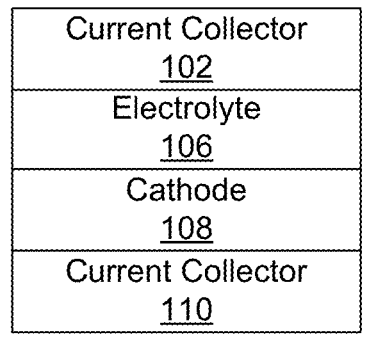
Figure 17:
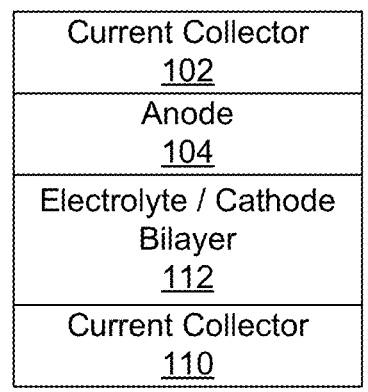

FIG. 15 shows an example of a schematic of a cell 100 according to certain embodiments of the invention. The cell 100 includes a negative current collector 102, an anode 104, an electrolyte 106, a cathode 108, and a positive current collector 110. The negative current collector 102 and the positive current collector 110 may be any appropriate electronically conductive material, such as copper, steel, gold, platinum, aluminum, and nickel. In some embodiments, the negative current collector 102 is copper and the positive current collector 110 is aluminum. The current collectors may be in any appropriate form, such as a sheet, foil, a mesh, or a foam. According to various embodiments, one or more of the anode 104, the cathode 108, and the electrolyte 106 is a solid-state composite including a first component as described above. In some embodiments, each of the anode 104, the cathode 108, and the electrolyte 106 is two- or three-component solid-state composite, as described above. FIG. 16 shows an example of schematic of a lithium metal cell as-assembled 200 according to certain embodiments of the invention. The cell as-assembled 200 includes a negative current collector 102, an electrolyte 106, a cathode 108, and a positive current collector 110. Lithium metal is generated on first charge and plates on the negative current collector 102 to form the anode. One or both of the electrolyte 106 and the cathode 108 may be a composite material as described above. In some embodiments, the cathode 108 and the electrolyte 106 together form an electrode/electrolyte bilayer as described above. FIG. 17 shows an example of a schematic of a cell 100 according to certain embodiments of the invention. The cell 100 includes a negative current collector 102, an anode 104, a cathode/electrolyte bilayer 112, and a positive current collector 110.

All components of the battery can be included in or packaged in a suitable rigid or flexible container with external leads or contacts for establishing an electrical connection to the anode and cathode, in accordance with known techniques.

EXAMPLE EMBODIMENTS

Example 1: Radical Polymerization PFPE with Thermal Initiator

In a glovebox operating under argon atmosphere, 2.4 g of lithium sulfide glass ($Li_2S:P_2S_5$=75:25) was placed in a cup.

1.04 g of PFPE dimethacrylate (Fluorolink MD 700, Solvay) was added, followed by 0.051 g of benzoyl peroxide and 7.3 g of dry Fluorinert 70. The cup was placed in a Thinky mixer (Thinky ARV-50LED) and mixed at 1500 rpm for 40 mins. The slurry was cast on aluminum foil using a doctor blade. The film was dried on the coater, while maintaining the vacuum, then was transferred to an antechamber and dried under vacuum at 60° C. The dried film was scraped off and the material was pressed into pellets under 120 MPa, using hydraulic press, and then heated at 125° C. for two hours. After that, the heating was removed, the pellet was cooled to room temperature and only then the pressure was released.

Example 2 Part 1: Synthesis of Diisopropylamine-Blocked 4,4-Diisocyanatodiphenylmethane (MDI-DIPA)

10.0 g of 4,4-diisocyanatodiphenylmethane (MDI) was weight out in a glovebox and placed in a dry 250 mL Schlenk flask equipped with a stir bar, followed by the addition of 180 mL of anhydrous toluene. The flask was closed with a rubber septum and placed on a stir plate under nitrogen flow. Next 11.2 mL of dry diisopropylamine (DIPA) was slowly added to the mixture over 5 mins. As the mixture progresses a phase separation of the product from the solution was observed. The mixture was stirred at room temperature for three hours, then the bottom phase of the mixture was separated and residual solvent was removed under vacuum resulting in a white solid. The product was further dried under vacuum at 60° C. for 24 hrs.

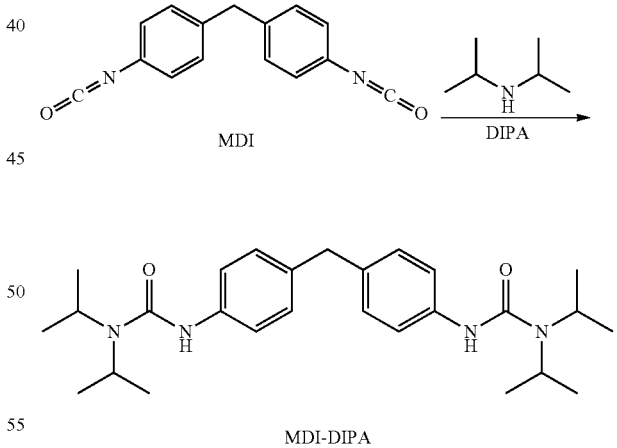

Scheme 1: Synthesis of MDI-DIPA

Example 2 Part 2: Step-Growth/Condensation Polymerization Hydrogenated Polybutadiene Diol with Blocked Diisocyanate

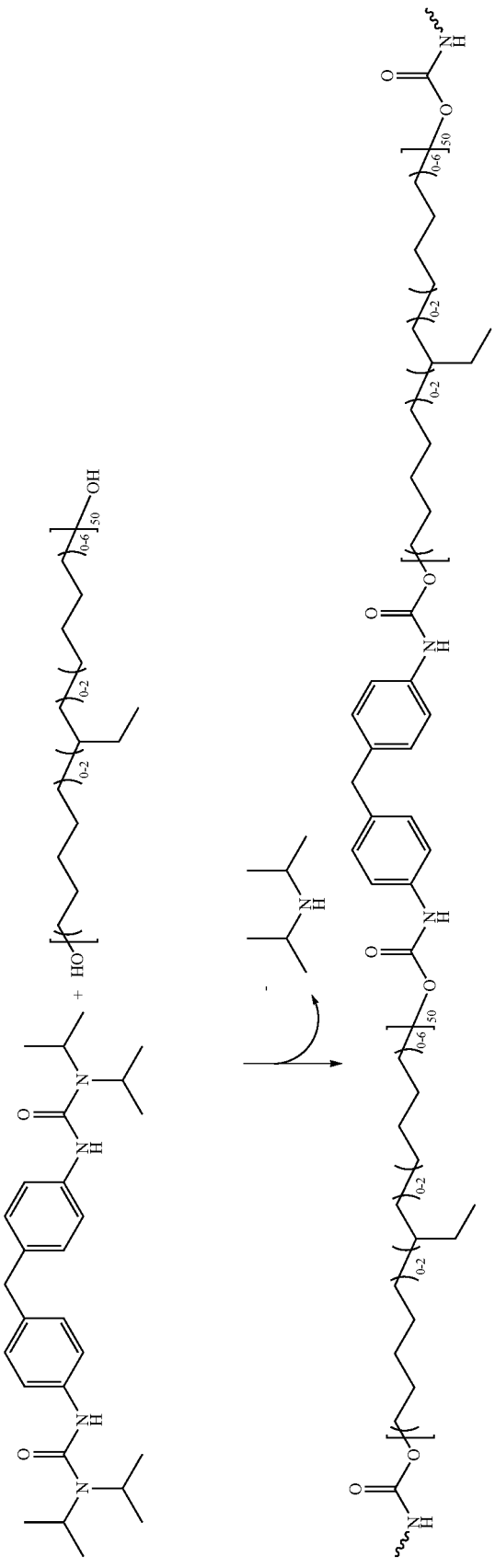
Scheme 1: Synthesis of Hydrogenate PBD diol with blocked diisocyanate In a glovebox operating under argon atmosphere, 2.55 g of lithium sulfide glass ($Li_2S:P_2S_5$=75:25) was placed in cup, next, 0.37 g of hydrogenated polybutadiene diol (Krasol HLBH-P 2000, Cray Valley) and 0.080 g of MDI-DIPA were added as a 25 wt. % solution in 1,2,4-trimethylbenzene, and extra 0.3 g of 1,2,4-trimethylbenzene was placed in the cup. The cup was placed in a Thinky mixer (Thinky ARV-50LED) and mixed at 1500 rpm. The slurry was cast on aluminum foil using a doctor blade. The film was dried on the coater, while maintaining the vacuum, then was transferred to an antechamber and dried under vacuum without heat for 16 hrs.

The dry film was cut into three 50×70 mm rectangles, each post-processed in a different way. All pieces of film were subjected to a pressure of 15 MPa for two hours using a vertical laminating press, however each was exposed to different temperatures while under pressure. The conductivities of films were measured in as Al|Al symmetrical cells sealed pouches. Each sample was measured at three different applied pressures at room temperature. Table 3 below shows the results:

TABLE 3

Conductivity for composite films processed at different temperatures

| Sample # | Press Temp./° C. | Cond./S · cm$^{-1}$ Applied Force/MPa | | |
|---|---|---|---|---|
| | | 0.1 | 15 | 95* |
| 1 | 25 | 1.4 · 10$^{-6}$ | 6.6 · 10$^{-6}$ | 6.7 · 10$^{-5}$ |
| 2 | | 1.7 · 10$^{-6}$ | 1.7 · 10$^{-5}$ | 6.6 · 10$^{-5}$ |
| 3 | 100 | — | 9.4 · 10$^{-5}$ | 1.2 · 10$^{-4}$ |
| 4 | | — | 8.3 · 10$^{-5}$ | 1.0 · 10$^{-4}$ |
| 5 | 140 | 9.5 · 10$^{-5}$ | 1.1 · 10$^{-4}$ | 1.0 · 10$^{-4}$ |
| 6 | | 1.1 · 10$^{-4}$ | 1.2 · 10$^{-4}$ | 1.1 · 10$^{-4}$ |

*Values after thickness adjustment due to densification.

The temperature for the reaction to occur was determined by differential scanning calorimetry (DSC). DSC analysis of cast, dry sample (exotherm of reaction). The cross-linking was confirmed by DSC and thermogravimetric analysis (TGA), by disappearance of the exothermic signal of polymerization reaction and decreased weight loss of the sample respectively.

Referring to the above table, samples 1-4 show increased conductivity with increased applied pressure, while samples 5 and 6 maintain conductivity even at ambient pressure (0.1 MPa). This indicates that at 140° C., sufficient external energy is applied to initiate in-situ polymerization and that the in-situ polymerization allows the samples to maintain conductivity even after pressure is released.

Example 3: Analysis of Hybrid Synthesis Via In-Situ Polyurethane Formation

Hybrids of lithium sulfide glasses with polyurethane polymer matrix are synthesized as described in Example 2. The formation of polyurethane occurs at elevated temperature between diol (polymer or small molecule) and an 'in-situ' generated isocyanate. The isocyanate is produced as a result of dissociation of the blocking agent from protected isocyanate; hence, the reaction temperature has to be no lower than the temperature of the dissociation of the blocking agent ($T_{reaction} \geq T_{dissociation}$).

Figure 5:
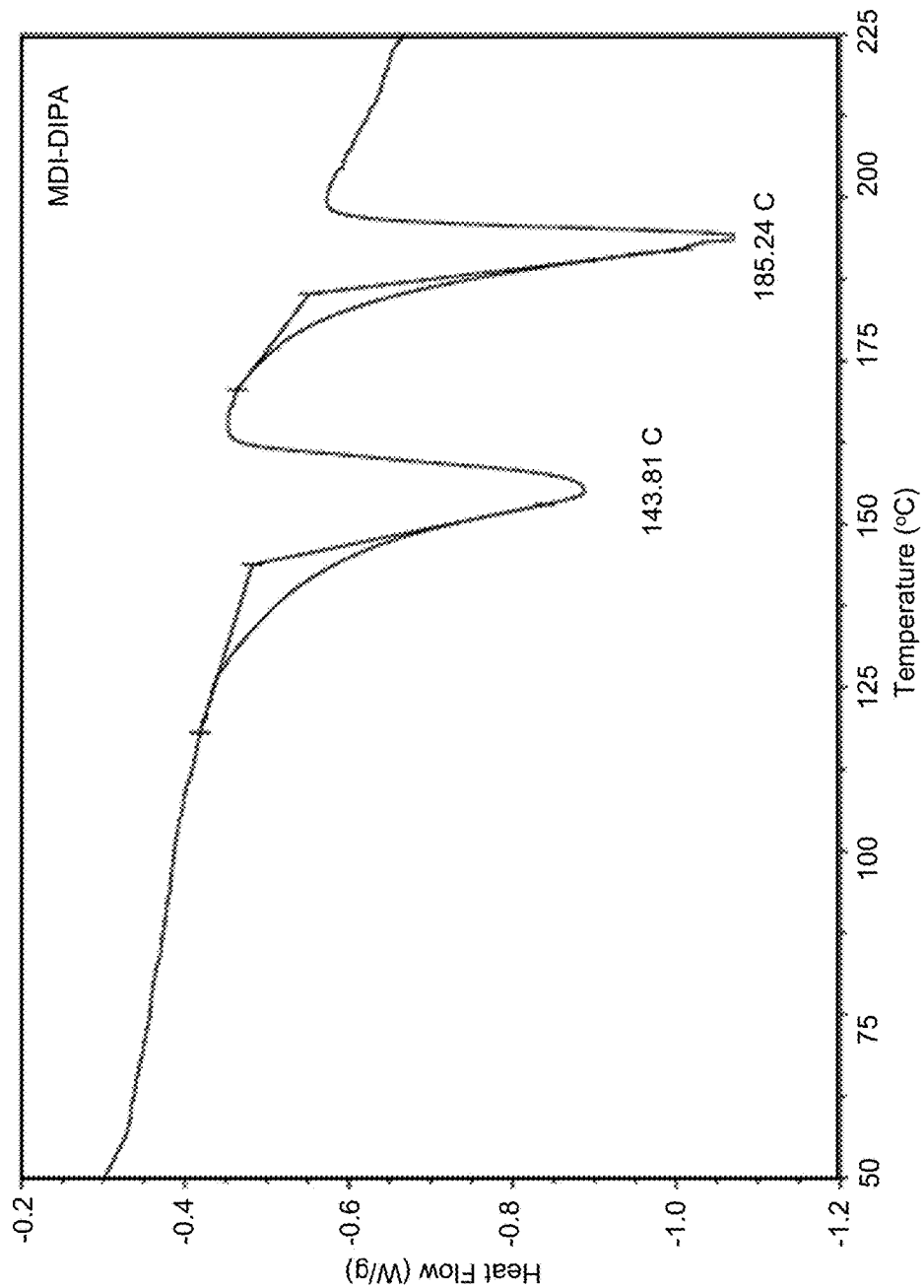
FIG. 5 is a differential scanning calorimetry (DSC) thermogram of 4,4-diisocyanatodiphenylmethane blocked with diisopropylamine (MDI-DIPA) in a method of synthesizing of a composite material via in-situ polyurethane formation according to certain embodiments of the invention.

Two main analytical techniques are employed in assessment of the decomposition process of blocked isocyanates: DSC and TGA. FIG. 5 shows a DSC thermogram of 4,4-diisocyanatodiphenylmethane blocked with diisopropylamine (MDI-DIPA), showing two endotherms with respective onset temperatures of $T_{1diss}$=143° C. and $T_{2diss}$=184° C.

The presence of two endotherms on the DSC thermogram indicates that the dissociation of diisopropylamine follows a two-step process (Scheme 1). When heated to $T_{diss1}$, only one of the isocyanate groups is unblocked (Step I, Scheme 1), and the system requires a higher temperature ($\geq T_{diss2}$) to release the other one (Step II, Scheme 1).

Scheme 3: Mechanism of dissosociation of diisopropylamine from MDI-DIPA

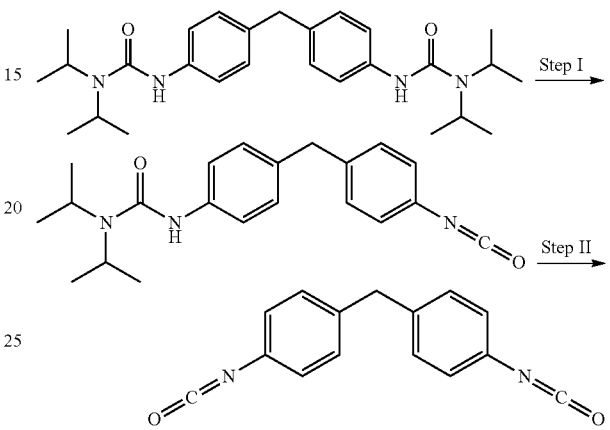

Figure 6:
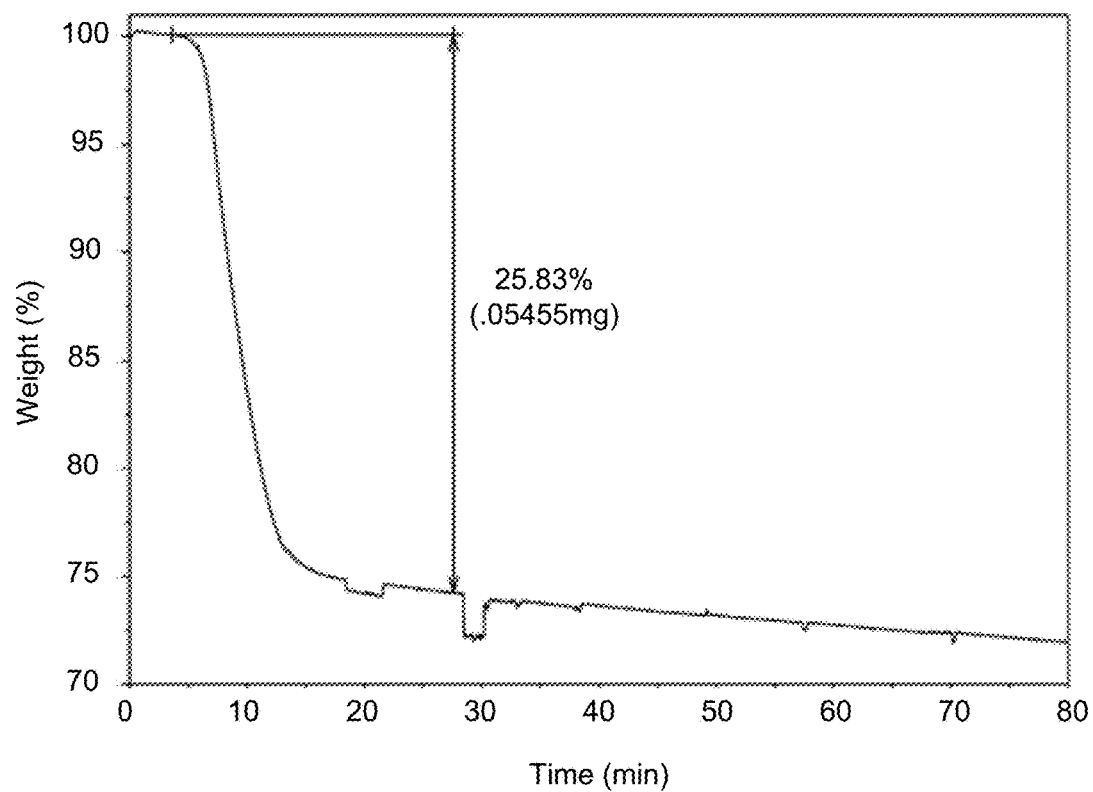
FIG. 6 is a thermogravimetric curve of MDI-DIPA from obtained from thermogravimetric analysis (TGA) in a method of synthesizing of a composite material via in-situ polyurethane formation according to certain embodiments of the invention.

The step-wise dissociation mechanism is further confirmed by TGA analysis of MDI-DIPA, performed under isothermal conditions, at 140° C. (FIG. 6). As expected, the analysis showed a 25 wt. % loss, which corresponds to the loss of one DIPA molecule and correlates well with the theoretical value of about 23 wt. %

Figure 7:
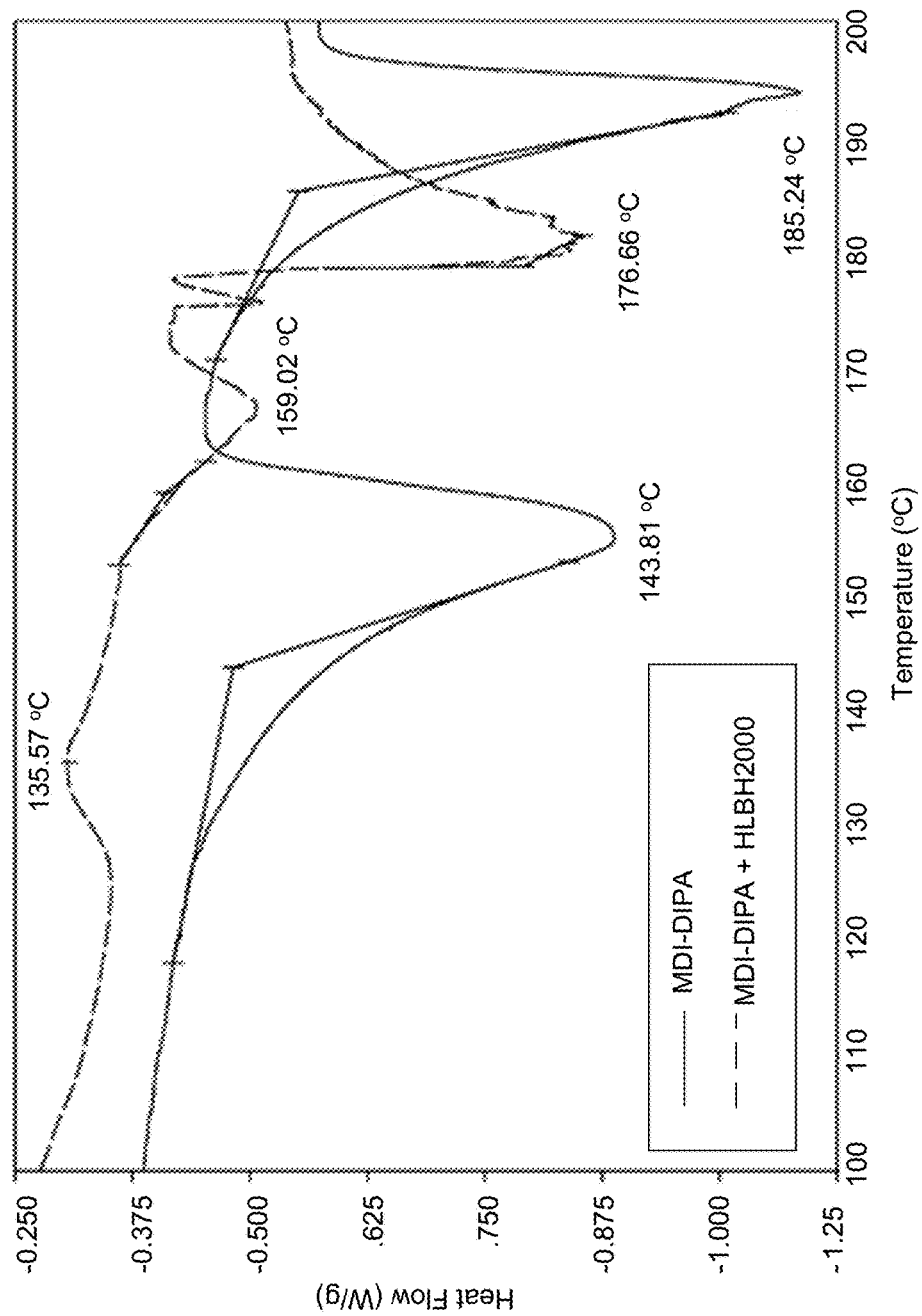
FIG. 7 is a DSC thermogram of a mixture of polymerizable components MDI-DIPA and HLBH2000 obtained in a method of synthesizing of a composite material via in-situ formation according to certain embodiments of the invention.

Next, DSC was used to analyze a mixture of polymerizable components MDI-DIPA and HLBH2000. The data shows that in the presence of the diol (HLBH2000) the endotherm with onset temperature at $T_{diss1}$~140° C. (solid line, FIG. 7) disappears, and is replaced with an endothermic peak at $T_{end1}$~136° C. (dashed line, FIG. 7). The appearance of the exotherm is an indication of the polymerization (polyurethane formation) between (blocked) isocyanate and diol. However, the disappearance of the endotherm suggests that the process occurs via one-step transesterification, rather than two-step dissociation-condensation reaction.

Figure 8:
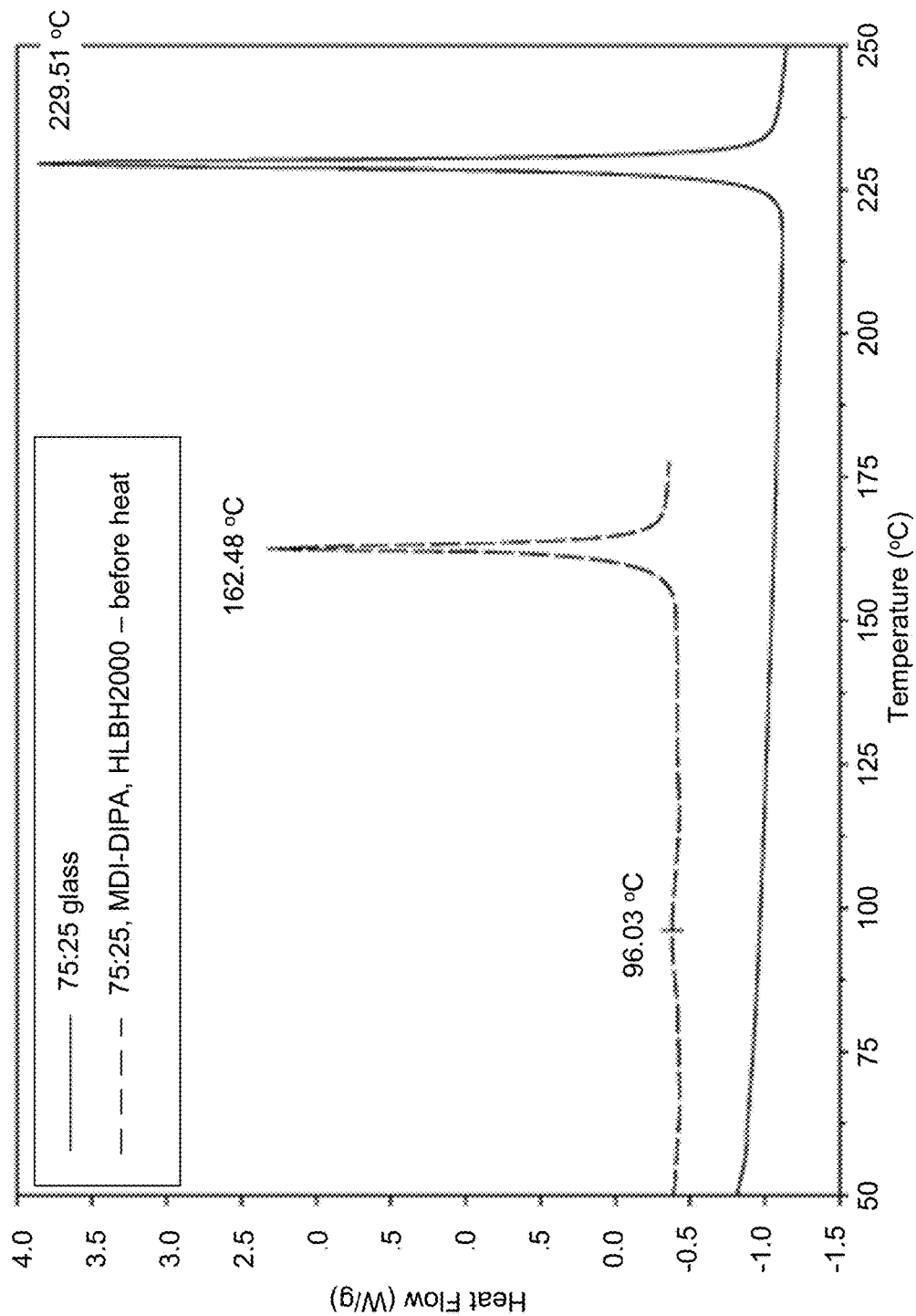
FIG. 8 shows DSC traces of pure $Li_2S:P_2S_5=75:25$ glass (upper trace) and a composite, according to certain embodiments of the invention, of the same sulfide glass, HLBH2000, and MDI-DIPA, before heat treatment (lower trace).

Finally, DSC and TGA analyses were performed on the full hybrid formulation of lithium sulfide glass and pre-matrix components, specifically HLBH2000 and MDI-DIPA, prepared by a thin-film casting method. The analyses provide several different pieces of information: a) temperature required to initiate 'in-situ' polymerization in polyurethane hybrids (DSC), b) thermal stability of the sulfide glass in the pre- and post-polymerized hybrid, and c) occurrence and progress of the polymerization in the organic matrix. FIG. 8 shows DSC traces of pure $Li_2S:P_2S_5$=75:25 glass (upper trace) and the hybrid mixture of the same sulfide glass, HLBH2000 and MDI-DIPA, before heat treatment (lower trace). The pure glass analysis shows only one endotherm at $T_{1cryst}$=230° C., which is related to the glass crystallization (solid blue, FIG. 4). When the same glass is combined with the matrix components, HLBH2000 and MDI-DIPA, two endothermal peaks are observed instead. The first, smaller signal at $T_{end2}$~96° C. is ascribed to the polymerization reaction, whereas the higher intensity peak at $T_{cryst2}$~162° C. corresponds to the glass crystallization. It is evident that the thermal stability of the sulfide glass decreases significantly in the presence of matrix components. This evidence is supported by the 67° C. drop in the crystallization temperature, and hence decreased thermal stability, of the glass in the pre-polymerized hybrid as compared to the pure glass. On the other hand, the presence of the sulfide glass catalyzes the polyurethane formation reaction, which is indicated by the shift of the polymerization endotherm from $T_{end1}$~136° C. (dashed line, FIG. 7) to $T_{end2}$~96° C. (lower trace, FIG. 8).

Figure 9:
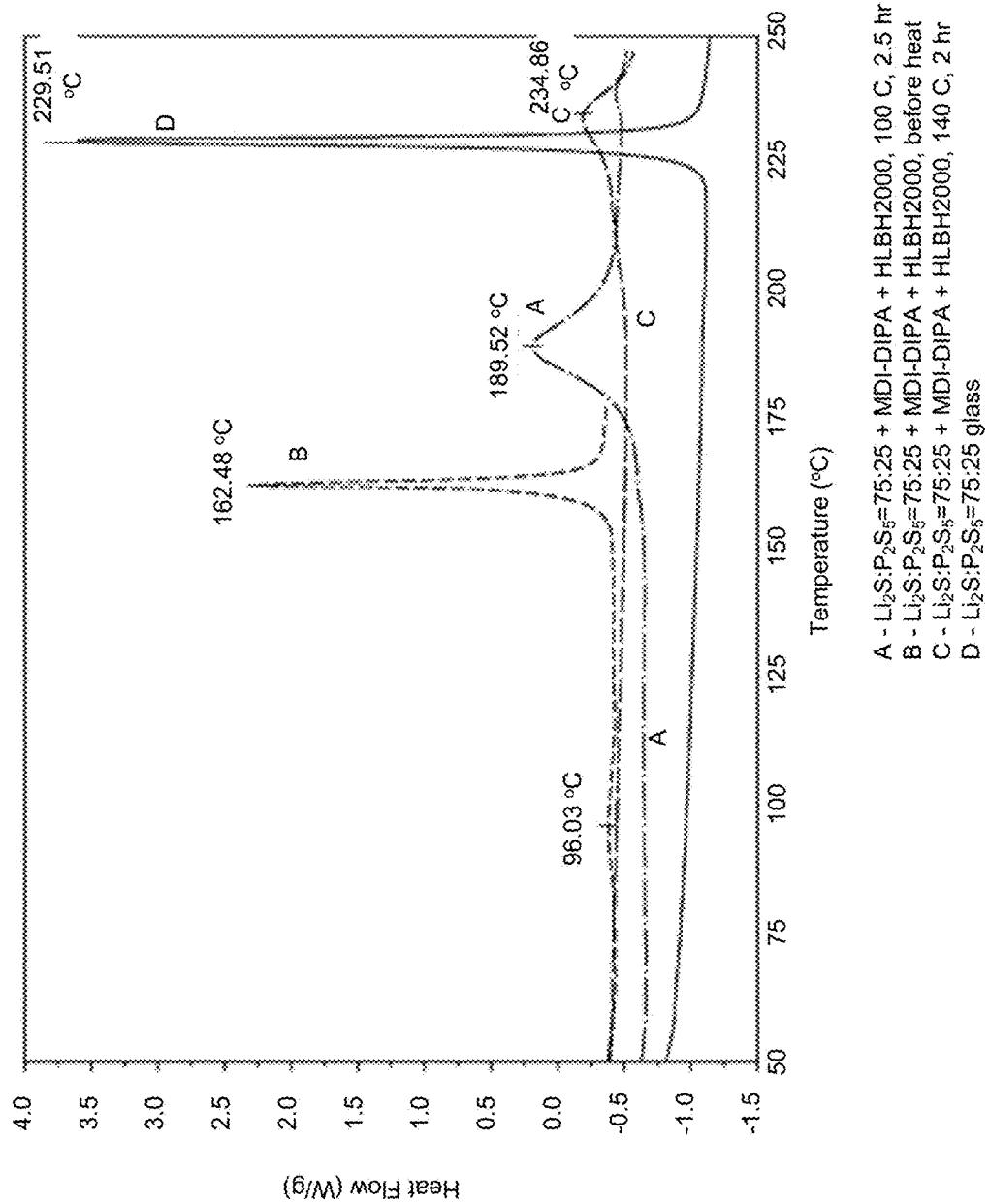
FIG. 9 shows DSC traces of a composite film according to certain embodiments of the invention treated at 100° C. and 140° C.

After determining the thermal stability of the glass and the polymerization temperature in the pre-polymerized hybrid, the thin film is subjected to thermal post-processing. The thin film is pressed in a horizontal lamination press at 15 MPa, then heated at 100° C. or 140° C. for 2 hrs, and cooled to room temperature, while applying the pressure. FIG. 9 shows DSC traces of the glass hybrid film treated at 100° C. and 140° C. As expected, the polymerization exotherm present in the pre-polymerized hybrid (short dash, labeled 'B') disappears when the film is exposed to either 100° C. (dash-dot trace, labeled 'A') or 140° C. (long dash trace, labeled 'C'), which confirms that the polymerization reaction within the hybrid is accomplished. In addition, based on the differences in observed crystallization temperatures, significant changes in the glass stability are noticed. The glass stability decreases by 67° C. when pre-polymerized matrix is introduced, but increases in the thermally treated (polymerized) hybrid. When the hybrid is pressed at 100° C., the thermal stability of glass is only 40° C. lower (dash-dot trace, labeled 'A') and it fully recovers when treated at 140° C. (long dash trace, labeled 'C'); hence providing evidence of the glass stabilization by in-situ polyurethane formation within the hybrid.

Figure 10:
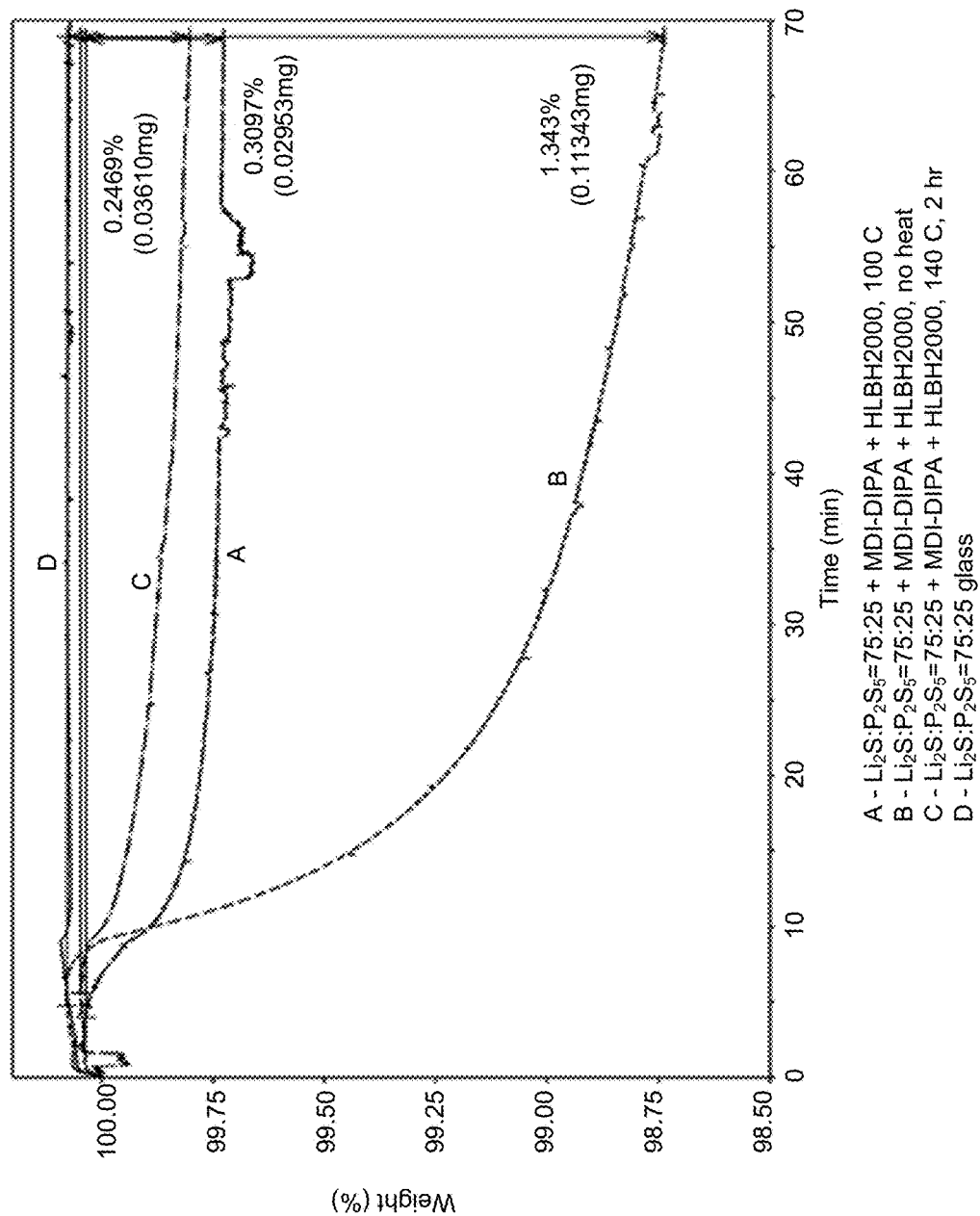
FIG. 10 is a thermogravimetric curve of four samples: pure sulfide glass, a non-treated composite thin film, a composite film according to certain embodiments heated at 100° C., and a composite film according to certain embodiments treated at 140° C.

TGA is used to provide additional indication that the polymerization reaction occurred. See FIG. 10. Four samples: pure sulfide glass (labeled 'D'), the non-treated thin film (labeled 'B'), and the film heated at 100° C. (labeled 'A') and 140° C. (labeled 'C'), are analyzed by isothermal TGA, at 100° C. for 100 mins. The pure glass (D) is stable and shows no weight loss at 100° C. The non-treated hybrid (loses ~1.34% of its weight which closely correlates with the theoretical value of 1.25 wt. %. This number assumes a complete dissociation of all diisopropylamine molecules from MDI-DIPA. When treated at 100° C. and 140° C., that weight loss changes to 0.31% and 0.24% respectively, indicating on the polymerization reaction and DIPA evaporating from the system. The values of weight loss, however, may suggest limited un-blocking efficiencies (75% and 82%) of MDI-DIPA, uncomplete evaporation of free diisopropylamine or insufficient fraction of alcohol groups in the pre-polymerized matrix.

Example 4: Ring Opening Polymerization—PDMS Polymers with Epoxy and Amino Functional Groups In a glovebox operating under argon atmosphere, 1.7 g of lithium sulfide glass ($Li_2S:P_2S_5$=75:25) was placed in a cup, next, 0.104 g of dry aminopropyl terminated polydimethylsiloxane (DMS-A11, Gelest) was added, followed by 1.0 g of dry 1,2,4-trimethylbenzene. The cup was placed in a Thinky mixer (Thinky ARV-50LED) and mixed at 1500 rpm for 30 mins. After that, the cup was opened and 0.196 g of dry epoxypropyl terminated polydimethylsiloxane (Sigma Aldrich) was added; the mixing was continued for 2 mins at 1500 rpm. The slurry was cast on aluminum foil using a doctor blade. The film was dried on the coater, while maintaining the vacuum, then transferred to an antechamber and dried under vacuum at room temperature. The film was dried for 16 hrs and then calendared using a vertical rolling press. The film thickness changed from 97 μm to 67 μm. The conductivity of the film pressed between two metal plates at 24 kPSI was $2 \cdot 10^{-5}$ S/cm.

Example 5: Cross-Linking of Butadiene Rubber as a Function of Glass Content

An example of a synthesis cross-linked polybutadiene sulfide glass composite material is shown below (Scheme 4)

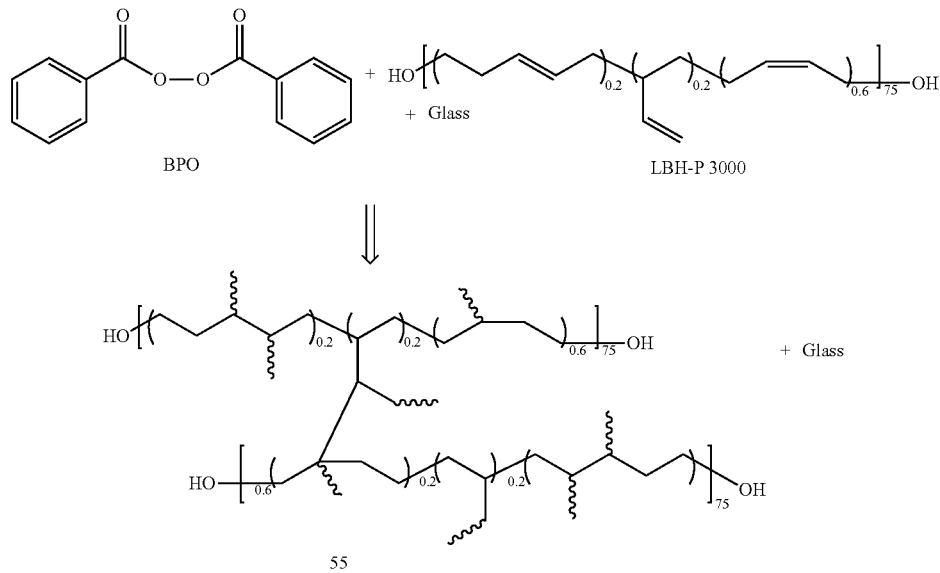

The above synthesis was used to form composite films of varying weights of glass ($Li_2S:P_2S_5$)=75:25, PBD (LBH-P 3000), and benzoyl peroxide (BPO) by radical cross-linking. Details of synthesizing and characterizing one sample (PDB 5) are provided in Example 6.

Film densities (before and after crosslinking) and conductivities (no external pressure and with external pressure) of PBD-5 and similarly-formed composites of various weight contents of $Li_2S:P_2S_5$=75:25 glass, LBH-P 3000 and BPO are provided below in Table 4. A "-" indicates that conductivity could not be measured.

TABLE 4

Densities and conductivities of composite films before and after cross-linking

| Sample | Glass vol. (wt.) % | Polymer vol. (wt.)% | BPO vol. (wt.) % | Processing | % theoretical density | $10^{-4}$ cond./ mS cm$^{-1}$ 0 in-lbs | 60 in-lbs |
|---|---|---|---|---|---|---|---|
| PBD-1 | 26 (42) | 72 (55) | 2 (3) | Dried | 105% | — | — |
| PBD-2 | 35 (53) | 63 (45) | 2 (2) |  | 102% | — | — |
| PBD-3 | 45 (63) | 53 (35) | 2 (2) |  | 103% | — | — |
| PBD-4 | 47 (65) | 50 (33) | 2 (2) |  | 104% | — | — |
| PBD-5 | 55 (72) | 44 (27) | 2 (1) | Dried | 84% | — | — |
| PDB-5.1 |  |  |  | X-linked | 102% | 0.27 | 0.42 |
| PBD-6 | 64 (79) | 34 (20) | 1 (1) | Dried | 74% | — | — |
| PDB-6.1 |  |  |  | X-linked | 108% | 0.61 | 0.58 |
| PBD-7 | 72 (84) | 27 (15) | 1 (1) | Dried | 68% | — | — |
| PDB-7.1 |  |  |  | X-linked | 102% | 1.07 | 1.04 |
| PBD-8 | 77 (88) | 22 (12) | 1 (1) | Dried | 62% | — | — |
| PBD-8.1 |  |  |  | X-linked | 84% | 1.04 | 1.08 |
| PBD-9 | 85 (92) | 14.5 (7.5) | 0.5 (0.5) | Dried | 60% | — | — |
| PBD-9.1 |  |  |  | X-linked | 77% | 1.08 | 0.97 |

Theoretical density is determined from the known densities and weight percentages of each component. Samples PBD-1 through PBD-4 were fully densified on casting and so were not cross-linked.

Figure 11:
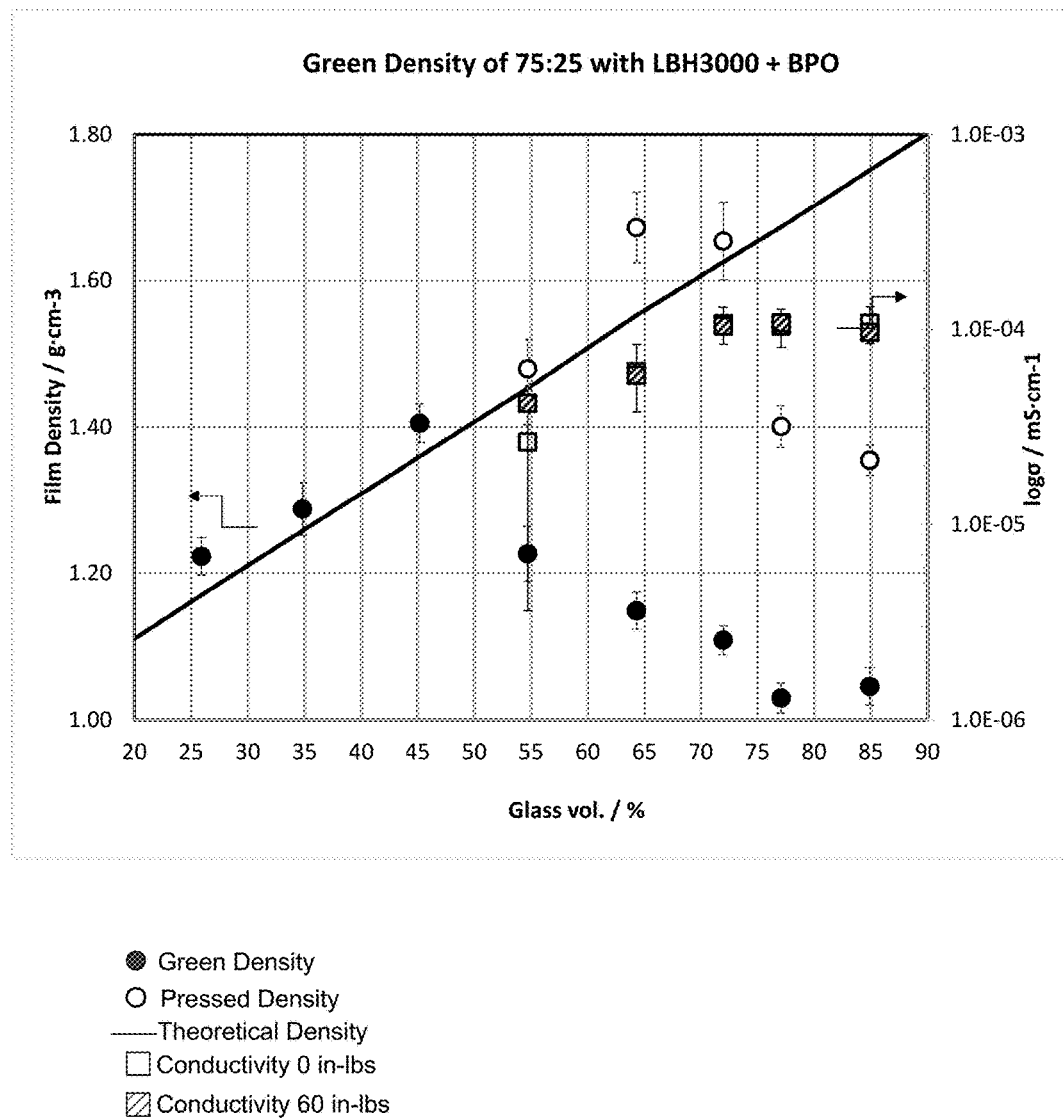
FIG. 11 is a plot shown a) film density before and after cross-linking composites according to certain embodiments under pressure and b) conductivities of pressed composites according to certain embodiments measured at 0 in-lbs and 60 in-lbs.

FIG. 11 is a plot showing film density and conductivity vs. glass volume percentage. Theoretical density, green density, and pressed density are shown for all samples. Conductivity at 0 in-lbs external applied pressure and 60 in-lbs external applied pressure is shown. The composite is as conductive without external pressure applied as with pressure applied, suggesting that the particles of the inorganic phase are held in place by the cross-linked network. Density is increased, including above the theoretical density at some loadings, after pressing.

Example 6: Radical Cross-Linking of PBD Composite Sample

Sample PBD-5 was formed and characterized by radical cross-linking as follows. In a glovebox operating under argon atmosphere, a 15 mL polypropylene cup was filled with 2.145 g of lithium sulfide glass (Li2S:P2S575:25) sieved to <25 μm, 0.810 g of LBH-P 3000 (LBH-P3000 Krasol, Cray Valley), 0.045 g of benzoyl peroxide and 2.0 g of dry 1,2,4-trimethylbenzene. Next, 25 g of Ø=10 mm zirconia balls were added to the mixture to aid mixing; the lid was tightly secured on the cup and wrapped with an electrical tape. The cup was placed on a tube roller at 80 rpm, and the slurry was mixed for 48 hrs. Next, the mixture was coated on aluminum foil using a square applicator with 6 mil gap size, the solvent evaporated under ambient conditions and then the film was further dried in an antechamber under vacuum at room temperature for 16 hrs. Afterwards, a 50 mm×70 mm piece of the film was cut out, placed between two sheets of aluminum foil and pressed at 100° C. for 3 hrs, under 16.8 MPa using a hydraulic press. The x-linked film was cooled down to room temperature, and only then the pressure was released. The film density was measured before and after crosslinking. The film conductivity was measured at no external pressure applied and at 60 in-lbs torque force.

Example 7: In-Situ Polyurethane Synthesis

An example of a synthesis of a linear polyurethane sulfide glass composite according to an embodiment is shown below in Scheme 5A.

Scheme 5A: Synthesis of a linear polyurethane sulfide glass composite

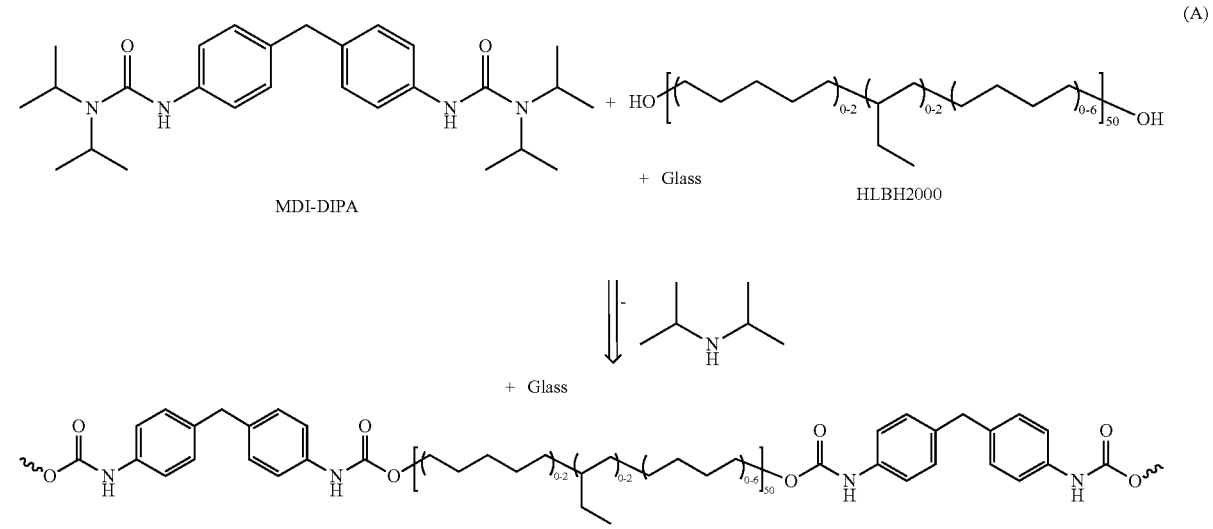

(A)

Scheme 5B: Synthesis of a cross-linked polyurethane sulfide glass composite

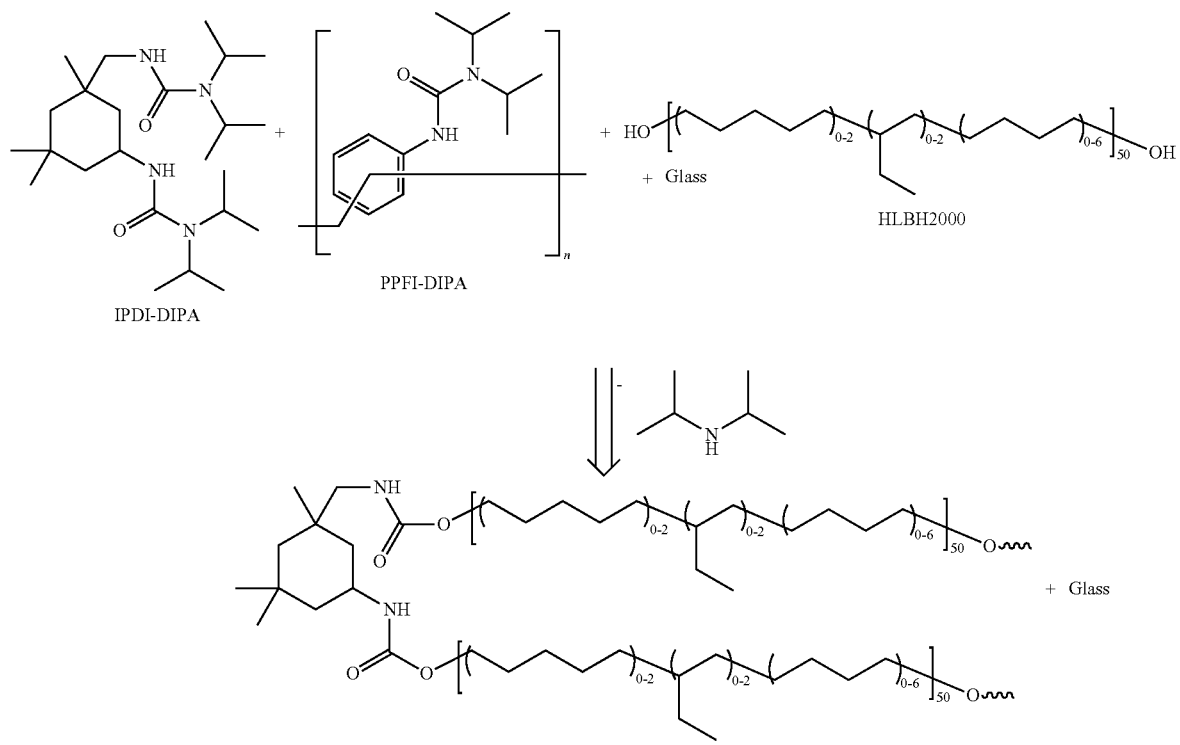

In a glovebox operating under argon atmosphere, a 30 mL Thinky cup was filled with 2.550 g of lithium sulfide glass ($Li_2S:P_2S_5$=75:25) sieved to <25 μm. A 25 wt. % solution of HLBH2000 mixed with PPFI-DIPA and IPDI-DIPA (1:9=n:n, NCO) in 1:1 molar ratio was prepared in 1,2,4-trimethylbenzene and dried over molecular sieves before use. Next, 1.80 g of dried stock solution was added to the glass, followed by 6 Ø=5 mm zirconia balls and 0.25 g of 1,2,4-trimethylebenzene. The cup was placed in a Thinky mixer (Thinky ARV-50LED) and mixed at 1500 rpm for 40 mins. Next, the mixture was coated on aluminum foil using a square applicator with 8 mil gap size, the solvent evaporated under ambient conditions and then the film was further dried in an antechamber under vacuum at room temperature for 16 hrs. Afterwards, a 50 mm×70 mm piece of the film was cut out, placed between two sheets of aluminum foil and pressed at 140° C. for 2 hrs, under 16.8 MPa using a hydraulic press. The cross-linked film was cooled down to room temperature, and only then the pressure was released.

Example 8: Polyurethane Crosslinking as a Function of Glass Content

Polyurethane composite films of different polymer compositions were prepared and characterized as described in Example 7. The results are shown in Table 5, below.

TABLE 5

| Sample | Poly Glass wt. % composition | Polymer | Processing | $10^{-4}$ cond./S cm$^{-1}$ 0 in-lbs | 60 in-lbs |
|---|---|---|---|---|---|
| PU-1.1 | 62.5 | HLBH2000, | 100° C., 48 hrs | ~0.001 | ~0.003 |
| PU-2.1 | 70 | IPDI- | 140° C., 2 h, | 1.25 | 1.14 |
| PU-4.1 | 85 | DIPA:PPFI-DIPA (9:1, n/n) | 6 tons | 1.97 | 2.22 |
| PU-5 | 85 | HLBH2000, | Dried | 0.02 | 0.67 |
| PU-5.1 |  | MDI-DIPA | 140° C., 2 h, 6 tons | 1.03 | 1.12 |

Example 9: Dual Cure Polymerization

Isophorone diisocyanate-diisopropylamine (IPDI-DIPA) is a blocked diisocyanate that acts as a difunctional monomer in polyurethane formation and can only participate in formation of higher molecular weight, linear polymers. A DSC trace of IPDI-DIPA (not shown) indicates a presence of two endotherms, at about 75° C. and 100° C., and confirms a step-wise decomposition of blocked diisocyanate (Scheme 6A) with a release of two diisopropylamine molecules per IPDI-DIPA.

Scheme 6A

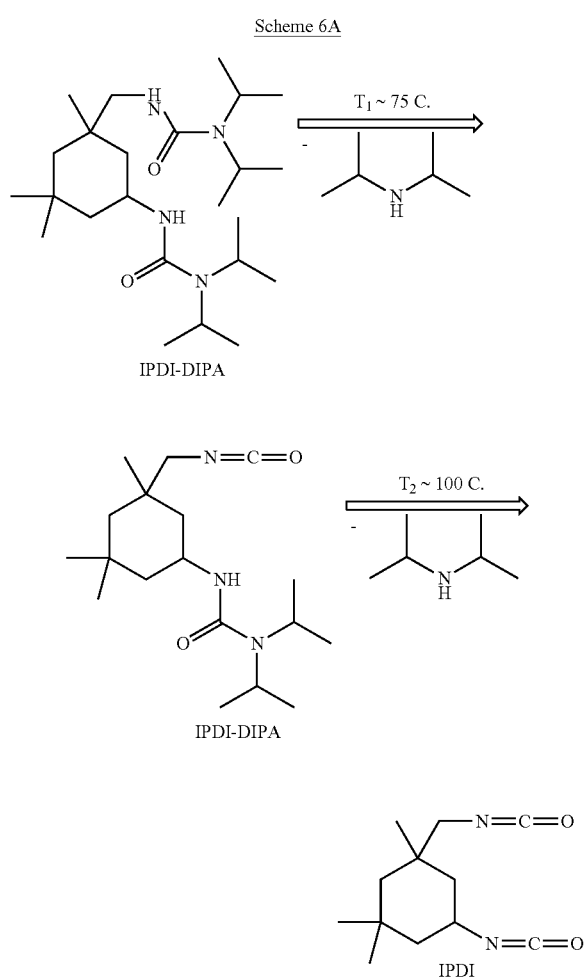

IPDI-DIPA

IPDI-DIPA

IPDI

Poly[(phenyl isocyanate)-co-formaldehyde] (PPFI-DIPA) is a blocked trifunctional isocyanate, that acts as a cross-linker during in-situ polyurethane formation, and is responsible for the formation of a polymer network. A DSC trace of PPFI-DIPA (not shown) shows a presence of three endotherms, at about 140° C., 165° C., and 190° C. The peaks correspond to a consecutive loss of three diisopropylamine molecules per one PPFI-DIPA, and confirms a step-wise decomposition of blocked cross-linker (Scheme 6B).

Scheme 6B

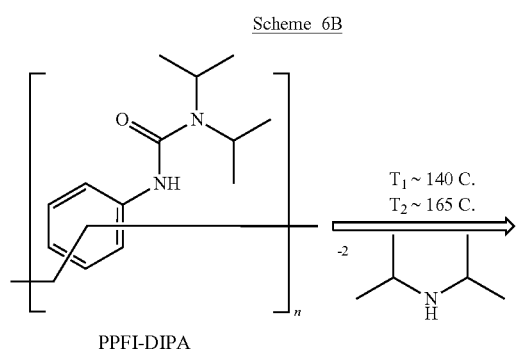

PPFI-DIPA

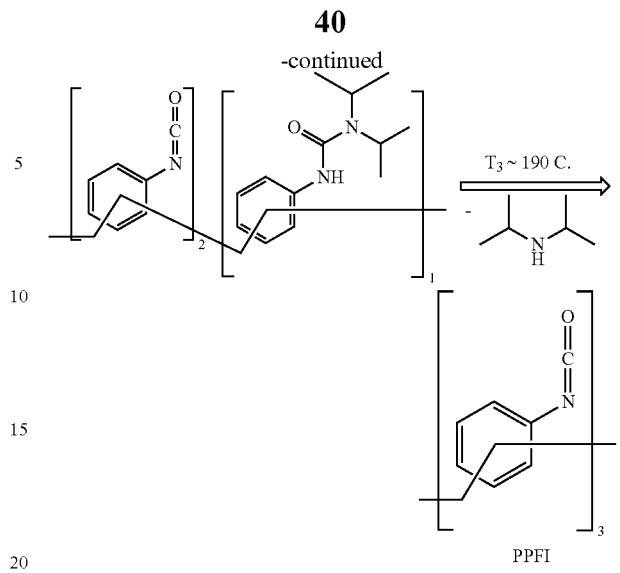

PPFI

Figure 12:
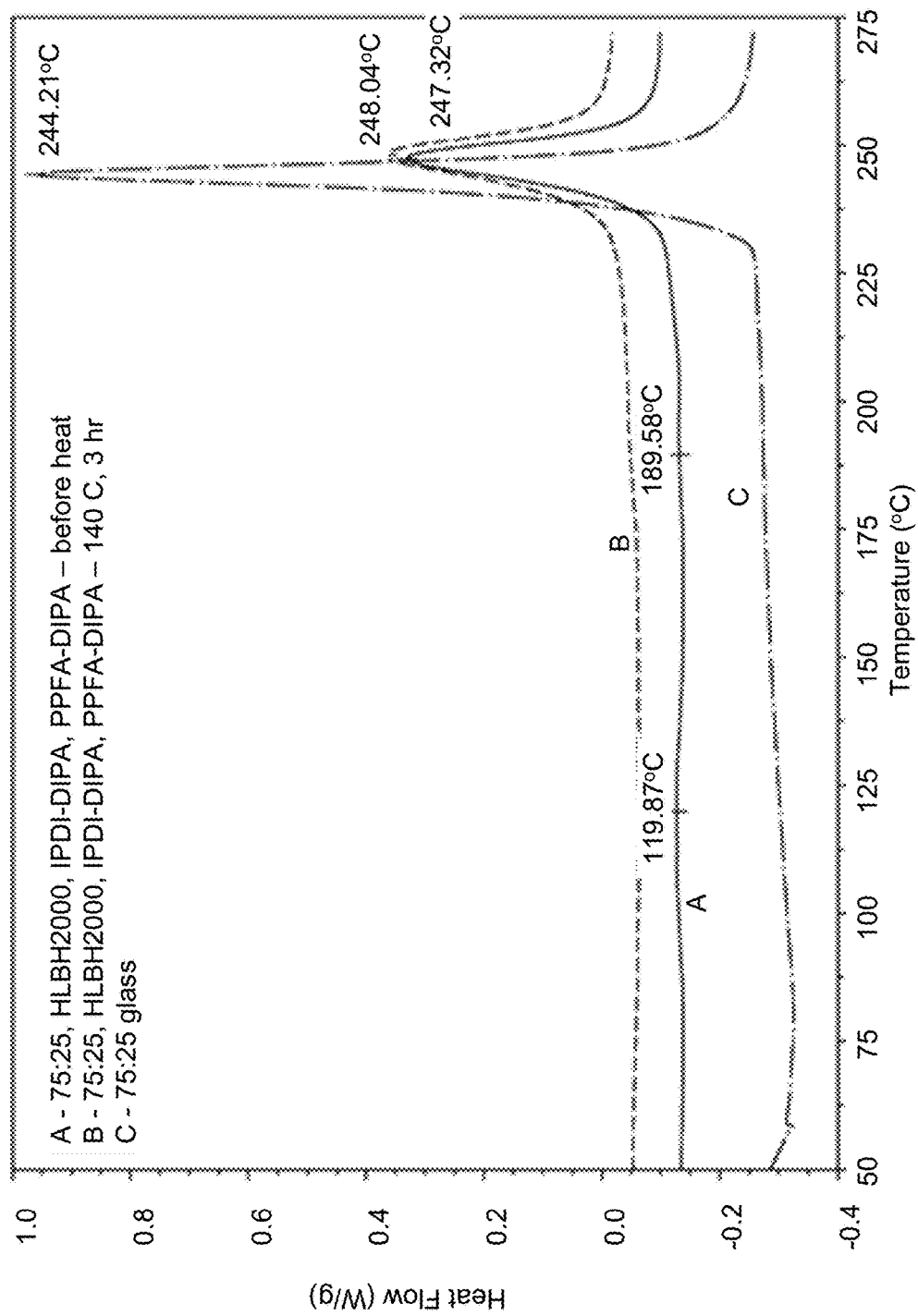
FIG. 12 shows DSC traces of pure $Li_2S:P_2S_5=75:25$ sulfide glass and a composite formed from the sulfide glass, isophorone diisocyanate-diisopropylamine (IPDI-DIPA), and poly[(phenyl isocyanate)-co-formaldehyde] (PPFI-DIPA) before and after in-situ polymerization of a polyurethane matrix of the composite.

FIG. 12 shows DSC traces of pure $Li_2S:P_2S_5=75:25$ sulfide glass (dash dot) and a composite formed from the sulfide glass, IPDI-DIPA, PPFI-DIPA before (solid) and after) in-situ polymerization of a polyruethane matrix of the composite. In all cases, the exothermic peak related to glass crystalization appears at about 245-250° C., which indicates a very good resistance of glass to crystallization in both pre- and polymerized organic matrix.

Figure 13:
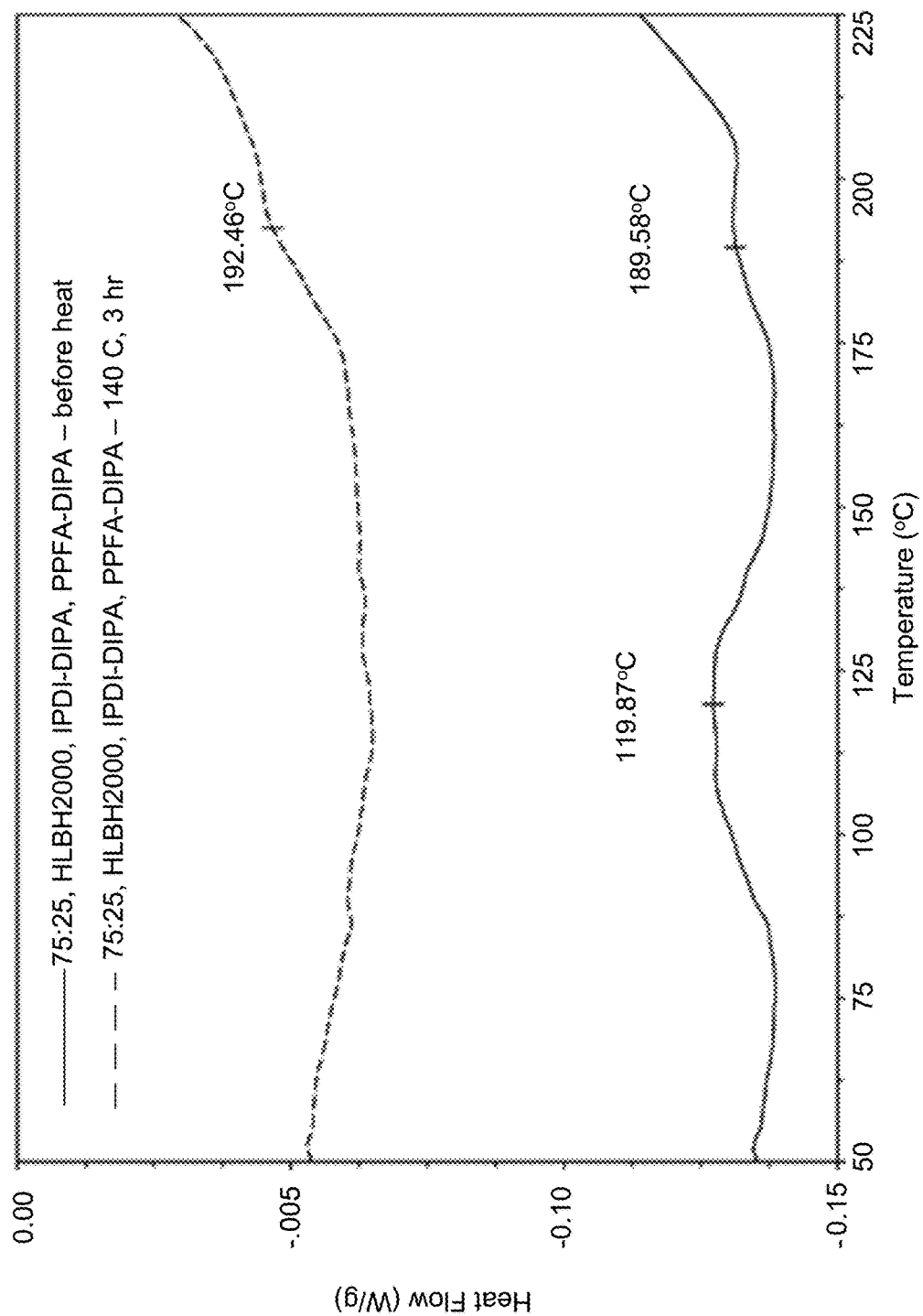
FIG. 13 shows magnified DSC traces of the composite of FIG. 12 before and after thermal crosslinking at 140° C.

FIG. 13 shows magnified DSC traces of the composite before (solid) and after (short dash) thermal crosslinking at 140° C. It can be seen that there are two broad exotherms, at about 120° C. and at about 190° C., in pre-polymerized matrix hybrid, which is possibly related to two-step curing of polyurethane network. The lower temperature exotherm (75° C.-150° C. range) may involve mostly curing with difunctional isocyanate (IPDI-DIPA), and hence the formation of higher molecular weight, linear polyurethane, whereas the second exotherm (175° C.-210° C.) is a result of the reaction with the cross-linker and a formation of a polyurethane network. This is evidenced by the DSC trace of the composite after curing at 140° C. (short dash). The trace shows no endothermic peaks at up to about 175° C., which provides evidence that the first step of curing (formation of higher molecular weight polyurethane chains) was completed during curing at 140° C. The endotherm signal at 175° C.-200° C. indicates that not all reactive components have reacted. Thus, the DSC after curing at 140° C. provides strong evidence that fully cross-linked polyurethane matrix can be prepared as the composite is heated to 175° C. and above, as it shows that below that temperature not all blocked isocyanate groups undergo deprotection.

In addition decomposition temperature obtained from DSC traces of pure blocked isocyanates, IPDI-DIPA and PPFI-DIPA (not shown), correspond well to reaction endotherms observed in pre-polymerized composite. The DSC of pure PPFI-DIPA shows that the release of the last (third) isocyanate group (that allows the PPFI-DIPA to act as a cross-linker) does not start until about 175° C. and has its minimum about 190° C. (short dash). Both temperatures overlap respectively with the onset and maximum temperature of the second reaction endotherm observed in pre- and post-polymerized composites (solid and short dash) in FIGS. 12 and 13.

In the description above and in the claims, numerical ranges are inclusive of the end points of the range. For example, "an average diameter between 0.1 µm and 500 µm," includes 0.1 m and 500 m. Similarly, ranges represented by a dash (e.g., 50%-99%) are inclusive of the end points of the ranges.

The foregoing describes the instant invention and its certain embodiments. Numerous modifications and variations in the practice of this invention are expected to occur to those skilled in the art. For example, while the above specification describes electrolytes and cathodes for alkali ion or alkali metal batteries, the compositions described may be used in other contexts. Further, the batteries and battery components described herein are no limited to particular cell designs. Such modifications and variations are encompassed within the following claims.

The invention claimed is:

1. A composition comprising:
a solid cross-linked polymer matrix that has substantially no added salts and is non-ionically conductive; and
ionically conductive inorganic particles constrained in the solid cross-linked polymer matrix,
wherein the ionically conductive inorganic particles are lithium-containing inorganic particles or sodium-containing inorganic particles, wherein the composition has an ionic conductivity of at least $10^{-4}$ S/cm at room temperature and wherein the composition is characterized by exhibiting the same ionic conductivity under applied pressures of 0.1 MPa and 95 MPa.

2. The composition of claim 1, wherein contacting ionically conductive inorganic particles form ionically conductive pathways throughout the composition.

3. The composition of claim 1, wherein the ionically conductive inorganic particles embedded in the solid cross-linked polymer matrix exhibit the same crystallization temperature as pristine ionically conductive particles.

4. The composition of claim 1, wherein the ionically conductive inorganic particles comprise partially crystalline particles.

5. The composition of claim 1, wherein the ionically conductive inorganic particles comprise amorphous particles.

6. The composition of claim 1, wherein the ionically conductive inorganic particles comprise isotropic conductive paths.

7. The composition of claim 1, wherein the ionically conductive inorganic particles comprise ceramic particles.

8. The composition of claim 1, wherein the ionically conductive inorganic particles are lithium-containing inorganic particles.

9. The composition of claim 1, wherein the ionically conductive inorganic particles are sodium-containing inorganic particles.

10. The composition of claim 1, wherein the solid cross-linked polymer matrix comprises a polyolefin, a polysiloxane, polystyrene, a cyclic olefin polymer, poly(urethane), a poly(ureaurethane), poly(thiourethane), a poly(acrylate), a poly(methacrylate), a poly(maleimide), poly(acrylamide), a poly(methacrylamide), or a cured epoxy resin.

11. The composition of claim 1, wherein the ionically conductive inorganic particles are sulfides.

12. The composition of claim 1, wherein the ionically conductive inorganic particles are oxides.

13. A composition comprising:
a solid cross-linked polymer matrix that has substantially no added salts and is non-ionically conductive;
ionically conductive inorganic particles constrained in the solid cross-linked polymer matrix, the ionically conductive inorganic particles comprising isotropic conductive paths;
wherein the composition has an ionic conductivity of at least $10^{-4}$ S/cm at room temperature, wherein the ionically conductive inorganic particles embedded in the solid cross-linked polymer matrix exhibit the same crystallization temperature as pristine ionically conductive particles.

14. The composition of claim 13, wherein contacting ionically conductive inorganic particles form ionically conductive pathways throughout the composition.

15. The composition of claim 13, wherein the ionically conductive inorganic particles comprise partially crystalline particles.

16. The composition of claim 13, wherein the ionically conductive inorganic particles comprise amorphous particles.

17. A composition comprising:
a solid cross-linked polymer matrix that has substantially no added salts and is non-ionically conductive;
ionically conductive inorganic particles constrained in the solid cross-linked polymer matrix, the ionically conductive inorganic particles comprising isotropic conductive paths;
wherein the composition has an ionic conductivity of at least $10^{-4}$ S/cm at room temperature.

18. The composition of claim 17, wherein contacting ionically conductive inorganic particles form ionically conductive pathways throughout the composition.

19. The composition of claim 17, wherein the ionically conductive inorganic particles comprise partially crystalline particles.

20. The composition of claim 17, wherein the ionically conductive inorganic particles comprise amorphous particles.

21. The composition of claim 17, wherein the ionically conductive inorganic particles comprise glass-ceramic particles.

* * * * *